(12) United States Patent
Olshefsky

(10) Patent No.: US 9,587,940 B2
(45) Date of Patent: *Mar. 7, 2017

(54) PRECISION HYDROSTATIC LEVEL AND FLATNESS MEASURING DEVICE, SYSTEM AND METHOD

(71) Applicant: Frank Olshefsky, Schenectady, NY (US)

(72) Inventor: Frank Olshefsky, Schenectady, NY (US)

(73) Assignee: Adam A. Olshefsky, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/051,322

(22) Filed: Feb. 23, 2016

(65) Prior Publication Data

US 2016/0169669 A1   Jun. 16, 2016

Related U.S. Application Data

(63) Continuation of application No. 14/456,004, filed on Aug. 11, 2014, now Pat. No. 9,273,988.

(60) Provisional application No. 61/868,886, filed on Aug. 22, 2013.

(51) Int. Cl.
  *G01C 5/04* (2006.01)
  *G01B 3/18* (2006.01)
  *G01F 23/00* (2006.01)
  *G01C 9/22* (2006.01)

(52) U.S. Cl.
  CPC ............... *G01C 5/04* (2013.01); *G01B 3/18* (2013.01); *G01C 9/22* (2013.01); *G01F 23/00* (2013.01); *G01F 23/0007* (2013.01)

(58) Field of Classification Search
  CPC .......... G01C 5/04; G01F 23/0007; G01B 3/18
  USPC .......................................................... 33/367
  See application file for complete search history.

(56) References Cited

U.S. PATENT DOCUMENTS

| | | |
|---|---|---|
| 124,389 A | 3/1872 | Rohrer |
| 259,408 A | 6/1882 | Macdonald |
| 386,924 A | 7/1888 | Kegel |
| 451,680 A | 5/1891 | Gamble |
| 915,084 A | 3/1909 | Eberhard |
| 967,587 A | 8/1910 | Tryon |
| 1,599,347 A | 9/1926 | Purkey |
| 2,150,048 A | 4/1938 | Boyd |

(Continued)

*Primary Examiner* — Christopher Fulton
(74) *Attorney, Agent, or Firm* — Jay R. Yablon

(57) ABSTRACT

A hydrostatic level-measuring system and related apparatus and method for measuring with precision, a level normal to gravitation of a physical surface, comprising: a plurality of N water-holding cups containing water and fluidically interconnected with one another and resting upon the physical surface, where N is greater than or equal to 2; each of the water-holding cups of comprising a cup height $h_n$ thereof from a bottom to a top of the cup which cup height $h_n$ is known a priori within acceptable measurement errors; and a micrometer system for measuring on an absolute or relative scale, a distance $d_n$ between the top of each the cup and the top surface of the water wherein a meniscus visible to a user is formed when the contact occurs and the meniscus is used to guide the measurement precision.

11 Claims, 11 Drawing Sheets

(56) References Cited

U.S. PATENT DOCUMENTS

| | | |
|---|---|---|
| 2,557,021 A | 6/1951 | Williams |
| 2,614,572 A | 10/1952 | Wisney |
| 2,804,692 A | 9/1957 | Karstens |
| 2,814,127 A | 11/1957 | Blatchford |
| 2,971,264 A | 2/1961 | Cowan |
| 3,015,167 A | 1/1962 | Chapman |
| 3,018,558 A | 1/1962 | Hannan et al. |
| 3,101,554 A | 8/1963 | Gottula |
| 3,132,428 A | 5/1964 | Haissig et al. |
| 3,269,023 A | 8/1966 | Calkins |
| 3,310,880 A | 3/1967 | Watts |
| 3,768,766 A | 10/1973 | Bain |
| 3,849,898 A | 11/1974 | Turloff |
| 4,026,156 A | 5/1977 | Bowditch |
| 4,087,920 A | 5/1978 | Huggett |
| 4,169,320 A | 10/1979 | Bennett |
| 4,384,410 A | 5/1983 | Melugin et al. |
| 4,625,424 A | 12/1986 | de la Haye |
| 4,686,773 A | 8/1987 | Brewer |
| 4,794,704 A | 1/1989 | Calcagni et al. |
| 4,894,924 A | 1/1990 | Nakanishi et al. |
| 4,972,596 A | 11/1990 | Brewer |
| 4,991,302 A | 2/1991 | Brewer |
| 5,131,156 A | 7/1992 | Owen |
| 5,279,040 A | 1/1994 | Kippelt et al. |
| 5,573,721 A | 11/1996 | Gillette |
| 5,709,034 A | 1/1998 | Kohner |
| 5,937,529 A | 8/1999 | Brewer |
| 6,119,511 A * | 9/2000 | Christian ............... G01N 13/02 |
| | | 73/64.48 |
| 6,655,036 B2 | 12/2003 | Cheng-I |
| 6,881,210 B2 * | 4/2005 | Wilson .................. A61B 5/031 |
| | | 604/540 |
| 7,937,847 B1 | 5/2011 | Karapetyan |
| 8,100,007 B2 | 1/2012 | Elsenhans et al. |
| 8,656,774 B2 * | 2/2014 | Moss ..................... G01N 11/00 |
| | | 73/311 |
| 9,273,988 B2 | 3/2016 | Olshefsky |
| 2010/0315070 A1 | 12/2010 | Hong |
| 2014/0345150 A1 | 11/2014 | Olshefsky |

* cited by examiner

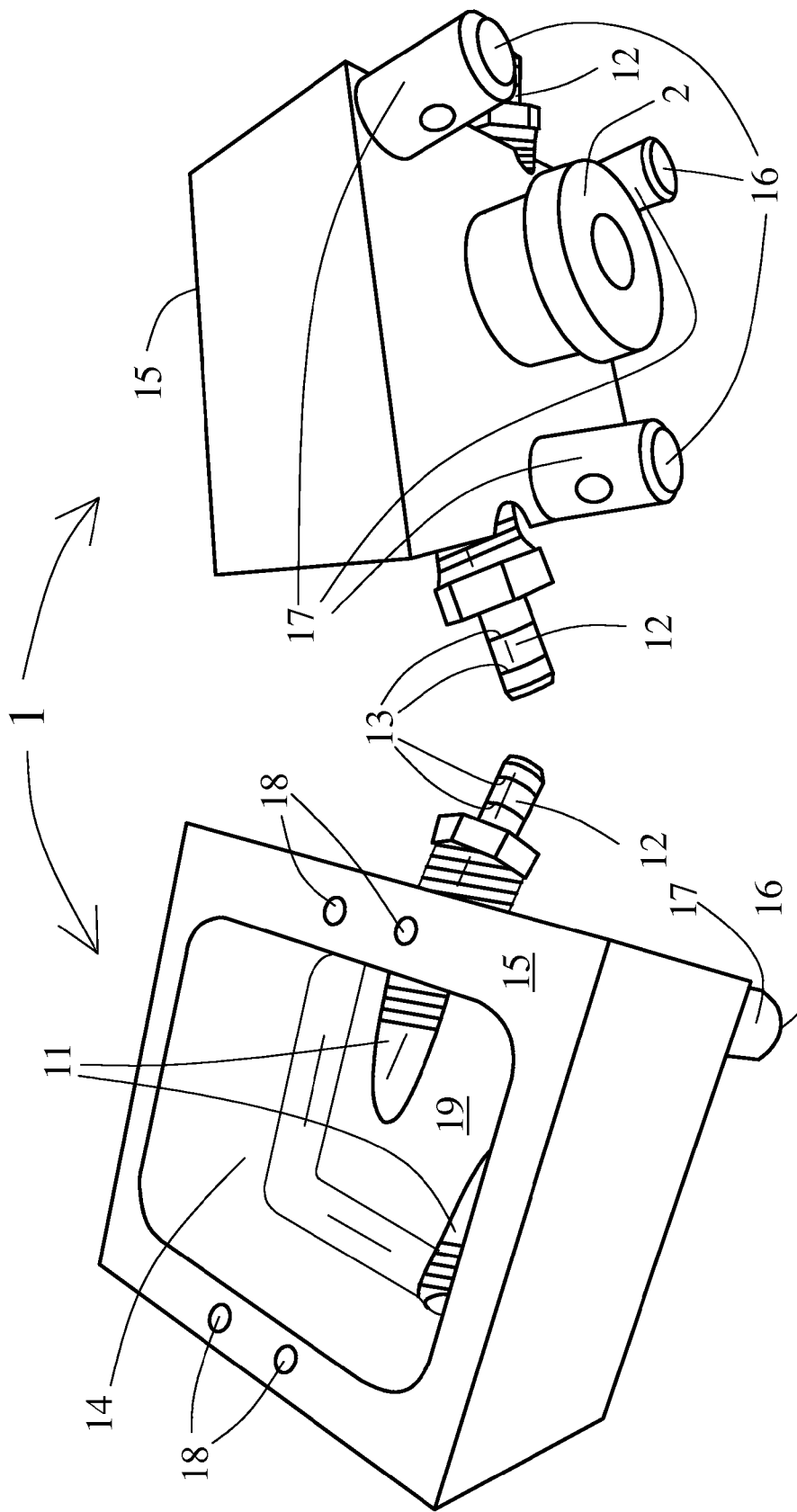

PRECISION HYDROSTATIC LEVEL AND FLATNESS MEASURING DEVICE, SYSTEM AND METHOD

CROSS REFERENCE TO RELATED APPLICATIONS

This application is a continuation of application U.S. Ser. No. 14/456,004 filed Aug. 11, 2014, now U.S. Pat. No. 9,273,988 issued Mar. 1, 2016, which in turn claims priority benefit of provisional application U.S. 61/868,886 filed Aug. 22, 2013. The foregoing are hereby incorporated by reference in their entirety.

BACKGROUND OF THE INVENTION

Basic physical science informs us that the upper surfaces of liquids such as but not limited to water situated in a gravitational field will naturally define a level horizontal surface which is normal to the direction of the gravitational field, with a mild curvature equal to that of the approximate 4000 mile radius of the earth. Similarly, it has long been known based on this same science that the surfaces of liquids in two or more fluidically-interconnected liquid containers or columns in a gravitational field will define a level surface normal to the gravitational field, once the fluid communication between the columns reaches static equilibrium and all flow ceases. This scientific understanding has been applied to develop a wide array of leveling devices and methods for establishing level surfaces relative to the earth's gravitational field. It is through the use of measuring devices which establish such a level, that it is possible to construct buildings and homes which are upright with respect to the earth's gravitational field, and to ensure that other structures or sensitive instruments which require leveling such as but not limited to turbines are in fact are situated in a leveled manner.

The use of fluidically-interconnected containers or columns to establish a level has become such common practice, that it has obtained its own sub-classifications within class 33 for "geometrical instruments" of the United States Patent Classification (USPC) System. Specifically, subclass 33/300 for "indicator of direction of force traversing natural media" generally covers any "device or method for indicating a direction related to that of some force (e.g., magnetic field, gravity etc.), of the type which will pass through a natural media (e.g., air, earth, water)." Within this subclass, the finer subclass 33/365 for "level or plumb, terrestrial gravitation responsive" covers devices "responsive to terrestrial gravitation and establishing either a horizontal or a vertical direction." And even further on point, subclass 33/367 for a "plural, similar, separable liquid columns system" covers a range of devices "including separable, independently movable liquid containers interconnected by a liquid conductor, the upper surfaces of the liquid in the containers establishing a horizontal direction."

While the principle and practice of using the upper surfaces of liquids in separate but interconnected liquid containers to establish a horizontal (level) direction responsive to terrestrial gravitation is thus well established in the art, the problem of how to practice this art to achieve exceptionally-high, fine grade leveling precision at better than $10^{-4}$ inches over a distance exceeding a few feet is not well-established and remains a work in progress. For such high-precision leveling, "noise" factors come into play which can be ignored for less-fine leveling, but which cannot be ignored and must be systematically addressed, isolated, and eliminated to obtain high precision.

For example, a single bubble in the lines interconnecting the separate containers can modify the reading at the $10^{-4}$ inches level of precision. So too can a single dust particle on the surface of whatever device probes the water, or a gradient in temperature along the fluidic connection, or a difference in temperature between the fluid system and the ambient air. Too much bending or drooping in the tube interconnections can also modify a measurement. Even the surface tension of the fluid including the cohesion between fluid molecules and the adhesion between the fluid molecules and the container and the probing device can modify a measurement if not properly accounted for and addressed.

Some of the cautions mentioned above are most applicable to a measuring system utilizing one micrometer and a plurality of water cups as is disclosed in some of the invention embodiments here, and they arise because of the time it takes to perform a reading on multiple cups with one micrometer. In fact, at the $10^{-4}$ inches or better level of precision, if the radius of the surface for which one seeks to establish a level is greater than about 20 feet, the earth's curvature itself can skew the measurement if not properly accounted for, because the "level" surface being measured now covers a large enough portion of the earth's surface so that it is not flat, but possesses the very mild curvature of a spherical surface with a 3959 mile radius, namely, the tide-averaged mean radius of the earth. Thus, at this fine a scale of precision, one is measuring not only level, but also, flatness. Historically, this very phenomenon, in the form of ships disappearing in the distant horizon, contained the first Copernican clues of a round earth.

While a number of the patents which can be found in subclass 33/367 of the USPC such as U.S. Pat. No. 5,131,156; U.S. Pat. No. 3,269,023; U.S. Pat. No. 4,384,410; U.S. Pat. No. 4,686,773 all involve efforts to achieve some degree of precision for a gravitational leveling system using fluids in interconnected containers, they do not appear capable of $10^{-4}$ inches or better precision, and as is seen in FIG. 5 of U.S. Pat. No. 4,384,410, at least some of these devices rely upon supplementing the fluidic leveling device with computerized control circuitry that contributes to the establishment of the more-precise level. It is preferable to be able to establish a high-precision level simply, using only the science and technology of fluids and their response to gravity coupled with simple linear length measurement instruments such as micrometers, while omitting the use of or need for complex data processing or other cumbersome or expensive technologies.

SUMMARY OF THE INVENTION

Disclosed herein is a hydrostatic level-measuring system and related apparatus and method for measuring with precision, a level normal to gravitation of a physical surface, comprising: a plurality of N water-holding cups containing water and fluidically interconnected with one another and resting upon the physical surface such that a top surface of the water within each of the cups is stabilized (i.e., in static equilibrium) into being substantially the same as the top surface of the water within all of the other the cups by virtue of the gravitation acting on the water and the water becoming equalized among the cups via the fluidic interconnections, where N is greater than or equal to 2; each of the water-holding cups of comprising a cup height $h_n$ thereof from a bottom to a top of the cup which cup height $h_n$ is known a priori within acceptable measurement errors, where each of the cups is designated by a reference numeral n=1, 2, 3 . . . N; and a micrometer system for measuring on an absolute or relative scale, a distance $d_n$ between the top of each the cup and the top surface of the water within the cup by virtue of a portion of the micrometer system being physically aligned to the top of the cup and a probe tip at a lower extremity of the micrometer system being extended to contact the top surface of the water within the cup, thereby forming a meniscus visible to a user when the contact occurs; and a level $l_n$ of the water surface within each the cup n above the physical surface thereby being implicitly equal to $l_n=h_n-d_n$; wherein: by virtue of the micrometer system measuring each of the $d_n$ and thereby implicitly measuring each of the $l_n$, the user is able to deduce with precision how much the physical surface beneath each of the N cups deviates from being gravitationally level relative to the other N−1 cups.

This system, apparatus and method can be used not only to obtain high-precision measurements of a level using two cups for a linear level or three cups for a two dimensional surface are level, but due to its high precision, it can also measure flatness by using more than three cups because it is sensitive enough to detect the earth's curvature.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) summarized below.

FIG. 1 illustrates a top-front perspective view of a preferred embodiment of a water cup used in connection with the invention.

FIG. 2 illustrates a bottom-front perspective view of the water cup illustrated in FIG. 1.

DETAILED DESCRIPTION

Figure 3:
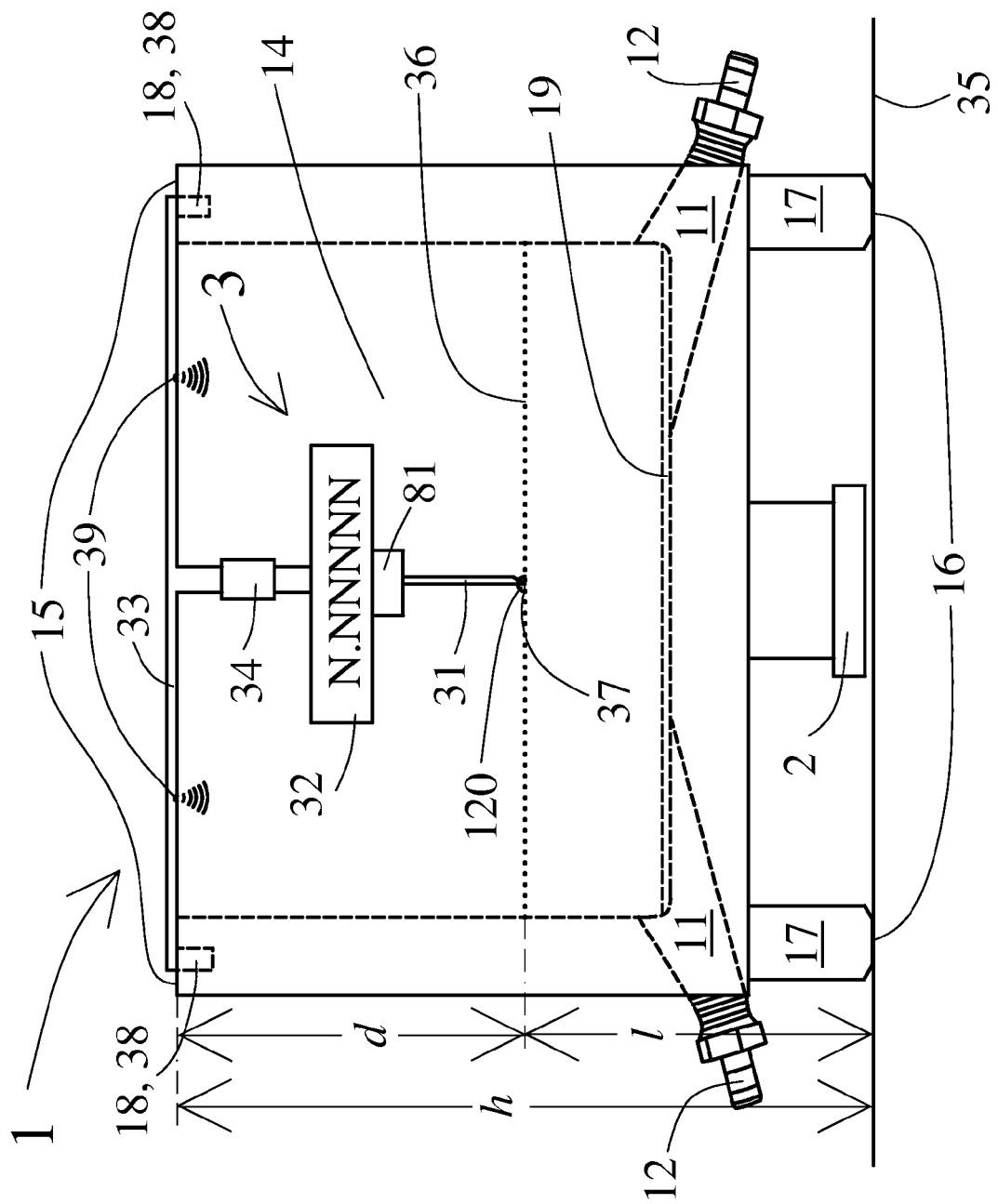
FIG. 3 is a schematic side plan view of the configuration and method through which level measurements are obtained for each water cup.

FIGS. 1 and 2 show a preferred embodiment of a water cup 1 used in connection with the invention from top-front and bottom-front views, respectively. Each water cup contains a plurality of water outlets 11 at the bottom of a water receptacle 14, and it is highly preferable that there be exactly two such water outlets 11 as is illustrated in FIG. 1. Each water outlet 11 is fluidically connected to and terminates in a water tube fitting 12. These fittings 12 are used as will shortly be described at FIGS. 4 and 5 to establish a fluidic connection to water tubes 4 which are in turn used to fluidically interconnect two or more water cups 1. One of the two fittings 12 is hidden from view in FIG. 1, and the fitting 12 which is shown on the right side of FIG. 1 is the same as the fitting 12 which is shown partially-obstructed on the right side of FIG. 2. Preferably, each fitting 12 comprises one or more raised circumferential rings 13 used to help secure the water tubes 4 in place over the fittings 12 such that there is no outward leakage of fluid and no inward entry of air from the fittings 12. These raised circumferential rings 13 make it easier to move the tubes 4 onto and off of the fittings 12.

Figure 17:
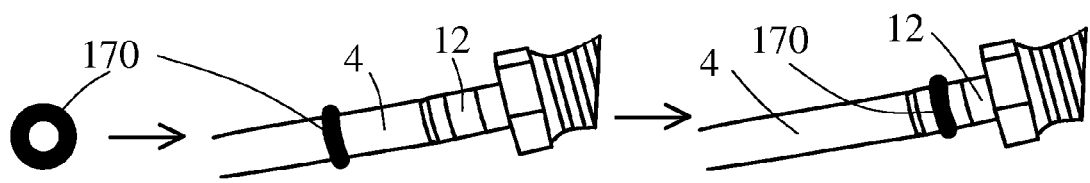
FIG. 17 is a plan view illustrating O-rings used as clamps to secure the tubing to the cup fittings.

As illustrated, the outlets 11 and fittings 12 are situated at a non-zero fitting angle relative to horizontal, so that any bubbles will not easily be trapped inside the fittings 12, and bubbles which do enter can be removed by slight tapping of the tubing near the bubbles so as to get them to rise and exit. Preferably, this fitting angle is oriented at approximately fifteen (15) degrees downward, though it can range on a continuous basis from as small as five (5) degrees downward to as large as forty five (45) degrees downward. To help seal the tubing 4 to the fittings 12, it is preferable to use O-ring "clamps" 170 as illustrated in FIG. 17 fitted to the outer circumference of the tubing 4 at each fitting 12, which are easy to roll onto the tubing 4 as illustrated, and roll off by reversing the illustration. Preferably these O-ring clamps comprise hard rubber or Neoprene or equivalent material.

Each water cup 1 also comprises a substantially flat upper micrometer resting surface which is also the topmost surface of the cup 15, as well as a plurality of legs 17 with substantially flat lower contact surfaces 16 at the bottom of the cups 1. Highly preferably, there are three such legs 17 so that the contact surfaces 16 form a triangle and the legs 17 form a tripod for stable and accurate contact with the measured surface 35 for which the level is being measured. Each water cup may also comprise an optional magnet 2 at the bottom of the cups 1 and substantially equidistant from each of the three circular legs 17 as illustrated. As shown in the side view of FIG. 3, these magnets 2 are slightly raised from the bottom plane of the tripod formed by the legs 17. In the event the leveling occurs on a surface 35 which is magneto-responsive, the magnets 2 will firmly secure the cups 1 to the surface 35 during the measurement, but because of being slightly raised, will not attract so strongly as to make it difficult to remove the cups 1 after the measurement is complete or interfere with the legs 17 making intimate contact with surface 35.

Now we turn to FIG. 3 which is a schematic illustration of the configuration and method through which level measurements are obtained for each water cup. As to any individual cup, one must be able to measure the water level height of the top surface 36 of the water above the measured surface 35, which water level height is designated as length 1 in FIG. 3. To deduce 1, one must know two other items of data. First, one must know the height of the upper micrometer resting surface 15 above the lower contact surfaces 16, which height is designated as h in FIG. 3. More simply put, h is total the height of the cup, which cup height h must be known a priori. Second, one must ascertain the distance between the upper micrometer resting surface 15 a.k.a. the top surface of the cup and the top surface 36 of the water, which distance is designated as d in FIG. 3. This distance d is ascertained using a micrometer system 3 in the manner to be reviewed in detail in the discussion to follow.

Figure 4:
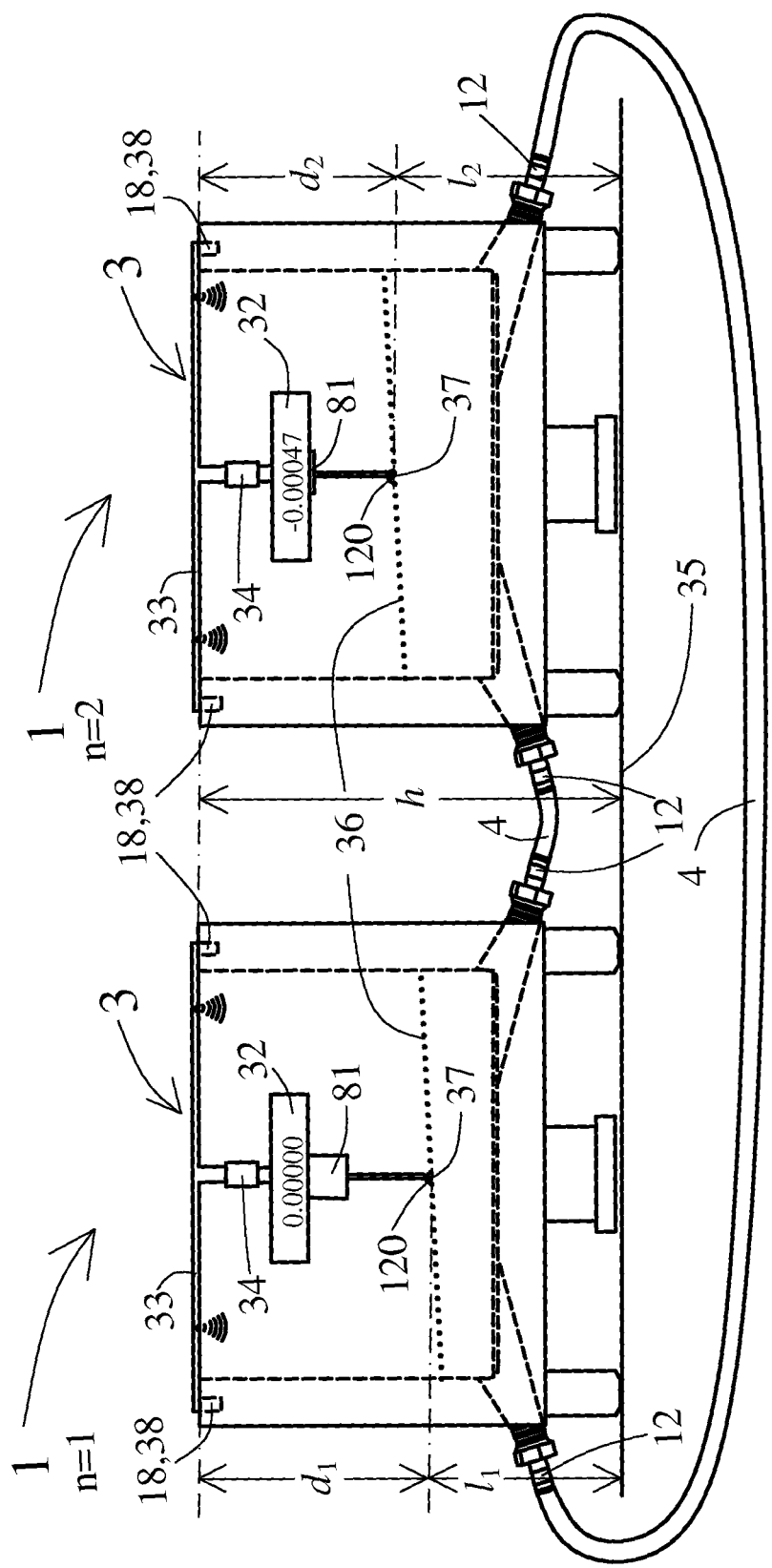
FIG. 4 is a schematic side plan view of a configuration in which two of the water cups of FIGS. 1 through 3 on an unlevel surface are fluidically interconnected with suitable tubing, and in which a schematically-illustrated micrometer system in a preferred invention embodiment is used to determine the degree to which this surface is not level.
Figure 5:
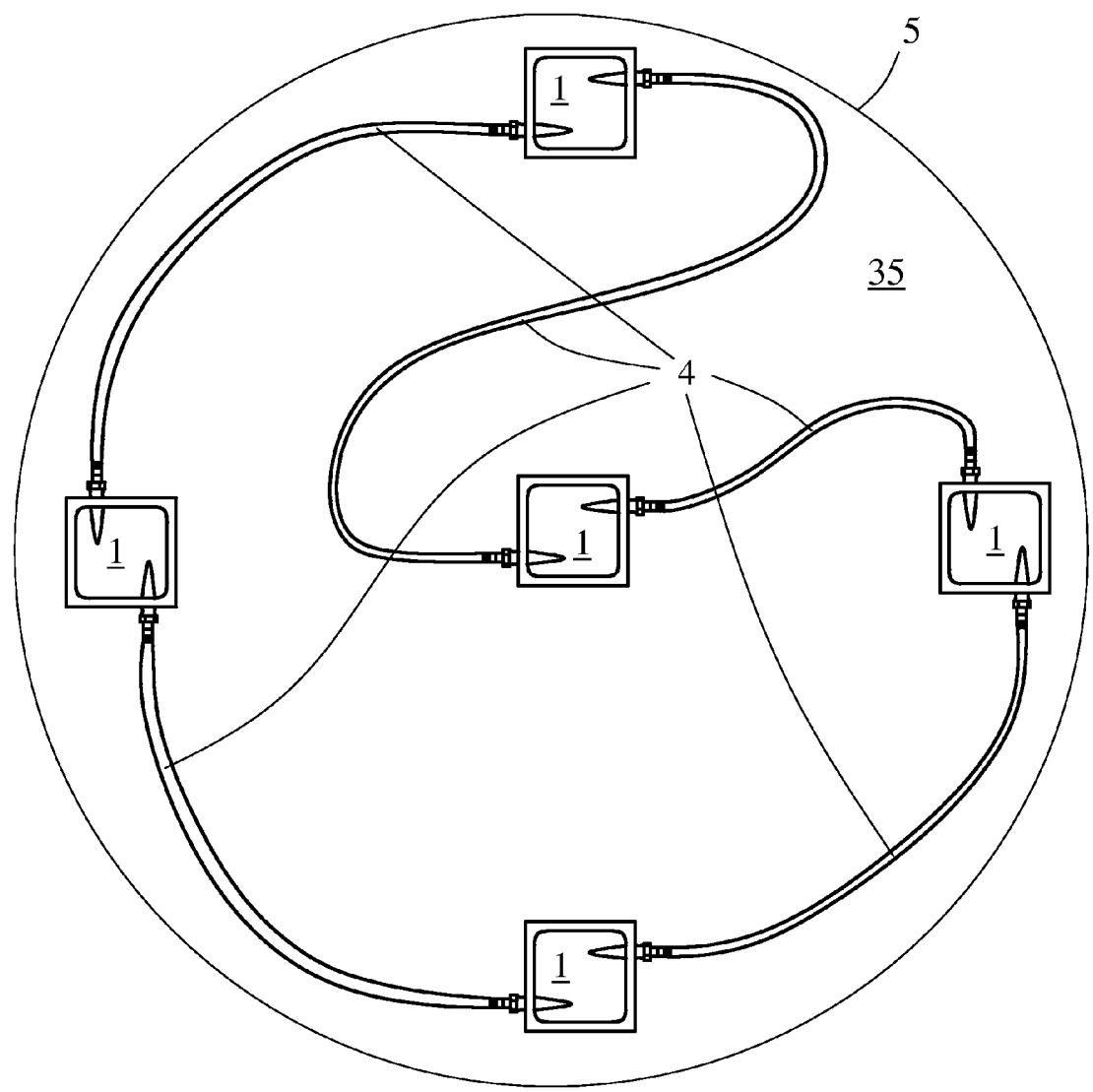
FIG. 5 is a top plan view of a plurality of water cups—in this non-limiting example five (5) cups—situated to take level and/or flatness measurements over a relatively wider area of a surface for which the level and/or flatness is being measured. The cup illustrated in the center may also be used to measure flatness relative to the other four cups.

After one has taken a micrometer measurement of d while given the a priori knowledge of h, one is able to then deduce from this combination of data that:

$$l = h - d, \quad (1)$$

which l, also designated in FIG. 3, is the height of the water level 36 above the measured surface 16. Once multiple cups 1 are fluidically interconnected via tubing 4 connecting the outlets 11 and fittings 12 between and among the multiple cups 1 as shown in FIGS. 4 and 5, the basis is established by measuring l for each cup by consistently-calibrated micrometer readings, to determine the level of the surface 35.

The micrometer system 3 which is used in connection with performing these measurements is represented schematically in FIG. 3, so let us now discuss the main features of micrometer system 3. Then, as we shall do starting with FIG. 7, it will be possible to discuss specific sorts of embodiments for the micrometer system 3 that will enable these measurements to be taken with high accuracy.

At bottom, micrometer system 3 must be able to measure the distance d as accurately as possible. Because the top of distance d is coincident with the top of height h by design, the top of the measurement taken by micrometer system 3 must be precisely aligned with the micrometer resting surface 15 a.k.a. top of the cup. To ensure this, micrometer system 3 must comprise a micrometer alignment section 33 which is rested upon micrometer resting surface 15 and at the same time is connected to the micrometer-proper at the upper measurement extremum of the micrometer-proper. By "micrometer-proper," we refer to that portion of the micrometer system 3 which contains the traditional micrometer hardware which actually produces an absolute or relative length reading in the form of a number as shown by a micrometer readout meter 32 which is preferable a digital display device. The illustrated, exemplary, non-limiting display in FIG. 3 at 32 reads in inches, with an accuracy to five decimal places i.e., $10^{-5}$ inches, but of course, metric measurements are also contemplated within the scope of the invention. To ensure that the micrometer system 3 is positioned consistently from one cup 1 to the next, it is also preferable to provide mating features 18 on the cups 1 as shown in FIG. 1, which mate with complementary mating features 38 of micrometer alignment section 33 as shown in FIG. 3. It is desirable that all of these features of the micrometer system 3 will be configured such that the micrometer-proper will situate very proximate the center of the cup 1 as shown, and the reason for this will be better elaborated when we shortly turn to FIG. 4. But it will be appreciated by studying FIG. 3, that the aforementioned combination of features will ensure a consistent, precise alignment of the upper measurement extremum of the micrometer-proper with the top surface 15 of the cup 1 from one cup to another.

Now we turn to the lower measurement extremum of the micrometer-proper, which must be able to precisely determine the distance d by which the top surface 36 of the water is descended below the top surface 15 of the cup 1. In some ways, the balance of the micrometer system 3 is a traditional micrometer-proper, which is to say it comprises a micrometer dialing mechanism 34 to extend and retract the micrometer proper possibly including Vernier calibrations, into the precise position at which a lower tip 37 of an elongated micrometer probe 31 produces a meniscus 120 by contacting the water surface, and to state the distance d at which the meniscus 120 was produced in absolute or relative terms via some length-dimensioned number as illustrated by micrometer readout meter 32.

Figure 14:
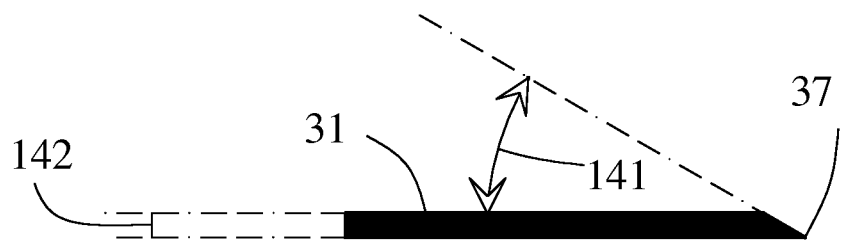
FIG. 14 illustrates a side plan view of an elongated micrometer probe and its probe tip in a preferred embodiment of the invention.

A preferred embodiment for micrometer probe 31 employs an elongated nylon monofilament line with the lower tip 37 cut at an approximate 30 degree angle; see the angle referenced by 141 in FIG. 14. Specifically, the act of rotating micrometer dialing mechanism 34 extends or retracts a micrometer extension head 81 to which micrometer probe 31 is connected, thus increasing or decreasing the distance d measured by the micrometer system 3. But because the micrometer readings are to be taken when the meniscus 120 is formed with the greatest temporal and spatial precision possible, the micrometer system 3 does differ from a traditional micrometer a) insofar as how it enables the user to carefully and precisely and slowly dial 34 of the micrometer-proper and then stop the dialing as precisely as possible at the time the meniscus 120 is formed, and b) insofar as how it enables the user to vividly visually see precisely when the meniscus 120 is formed so that the user can virtually instantly stop dialing. These differences drive the construction of specific embodiments for the micrometer system used to practice this invention, as will be discussed in connection with FIGS. 8 through 12.

It should be made clear that when speaking about an "absolute" distance, we are referring to a circumstance in which, for example, the micrometer readout meter 32 produces a number such as N.NNNNN=0.81259 inches which is synonymous with d in an absolute sense. By "relative" distance, we refer to a circumstance in which the micrometer system 3 is placed into a first cup 1, some readout is taken on the readout meter 32 precisely when the meniscus 120 is formed, and without in any way moving the dial 34 or otherwise changing the extension or readout 32 of the micrometer-proper, the user then presses a button or actuates some similar mechanism to turn that number into N.NNNNN=0.00000 inches so that a zero is associated with the micrometer at its given present extension. Then the micrometer is transported to a second cup 1 fluidically connected to the first cup 1, and the micrometer dialing mechanism 34 is adjusted to produce a meniscus 120 in the second cup. Then, assuming precisely equal heights h as between the first and second cups 1 (within desired margins of error which are to be very small), if, for example, the readout says N.NNNNN=0.00002, this will tell the user that the measured surface 35 beneath the second cup 1 is 0.00002 inches higher or lower relative to the measured surface 35 beneath the first cup 1, depending upon whether a positive number on the readout meter 32 means that the micrometer-proper is extended or retracted, i.e., depending on the orientation/definition of "positive" and "negative" with regard to the micrometer-proper.

If the first and second cups are not fabricated to precisely equal heights within desired margins of error, then it is necessary for these height discrepancies to be known a priori as well. Thus, each cup 1 will have associated with that cup, some "adjustment" number a which represents a discrepancy of the height of that cup from some standard cup height. Assuming these discrepancies are known as they must be, then the knowledge of these discrepancies becomes an adjustment to the l=h−d calculation for each cup. For example, if a first cup 1 has a known height h and a second cup has a height h+a where a is a small height discrepancy requiring adjustment and may be a positive or negative number, then for the first cup, l=h−d. But for the second cup:

$$l = h + a - d. \quad (2)$$

For more than two cups where the first cup has height h, and the subsequent cups require height adjustments $a_1$, $a_2$, $a_3$ . . . known a priori which we designate generally as $a_n$, the pertinent formulation will be:

$$l_n = h + a_n - d_n, \quad (3)$$

where $d_n$ is the distance measurement obtained from the micrometer system 3 when operating on cup n and $l_n$ is the deduced l for the same cup n. It will be appreciated that $a_n=0$ means that cup n has the same height $h_1$ and adjustment $a_1=0$ (by definition) as the first n=1 cup 1 within the desired margins of error, and that $a_n>0$ means that cup n has a slightly larger height than the first n=1 cup 1, and that $a_n<0$ means cup n has a slightly smaller height than the first n=1 cup 1.

We can generalize the above to absorb $a_n$ into the definition of the height of each cup n, such that $h_n=h+a_n$ defines the height of that cup. Then the generalized formula accounting for possible height differences among all of the cups 1 will be:

$$l_n = h_n - d_n. \quad (4)$$

In this generalization, for a total of N cups, it is preferred that all of the cups be fabricated so as to have equal height with the permitted margins of error, i.e., it is preferred to have $h_n=h$ for all N cups n=1, 2, 3 . . . N with permitted error margins. But if this is not the case, then one needs to know the height $h_n$ for each of cups 1 a priori, and general, having this knowledge of each cup 1 height is the preferred practice of the invention.

In the foregoing, we have been referring not only to the measurement carried out for a single cup 1, but to the measurements as between one cup and the next. Let us now illustrate this more specifically with the help of FIG. 4. In FIG. 4 we see two water cups 1 situated upon a measured surface 35 which has purposefully been drawn to be unlevel to such an exaggerated degree that the lack of level is visually clear. So here, N=2. This exaggeration of the unlevel surface in the FIG. 4 illustration helps to make clear the principles of operation of the invention, though it is to be understood that in practice, this invention will often be used for surfaces which are close to level for which the only way to detect the degree of unlevel grade is via a very accurate measurement using this invention.

In FIG. 4 we now show two water tubes 4 which fluidically connect together these two cups 1. In the context of human activity on the surface of the earth which is distinctively affected by the earth's gravitational field, it is well-understood a "level" "horizontal" surface is necessarily defined as a surface normal to the earth's gravitational field over any given line or area on the earth's surface. It will therefore be appreciated that because of the action of gravitation upon the water in the cups 1 and the fluidic interconnectedness of the cups 1, the water will move through the tubes 4 until a stable quiescent state is reached in which the top water surfaces 36 come to rest at a consistent level normal to the gravitational field as is illustrated by the fact that the two water surfaces 36 in FIG. 4 a) are each horizontal on the drawing and b) are each at the same height on the drawing with respect to one another. Therefore, as will be further discussed later, once the water has flowed through the tubes 4 and bubbles and dust and other "noise" has been removed from the system and the required time has elapsed to settle the system into a quiescent state, then by taking a consistent micrometer measurement of the water level in each cup thereafter, one is able to determine the degree to which the surface 35 is not level. In fact, let us see exactly how this is done for the N=2 configuration of FIG. 4.

In FIG. 4 we assume that the heights h of each cup 1 which are known a priori, are precisely equal within the desired margins of error. As to the "margins of error," this means that if it is desired to be able to measure level (really, variation from level) to within, say, 0.000001 inches, then so long as the two cups have heights which differ from one another by substantially less than 0.000001 inches, they may be regarded as precisely equal within the margins for error. Given this assumption for FIG. 4, this means that l=h−d will be the applicable formula for both cups, because we may use the first n=1 cup (on the left) as the $a_1=0$ control, and then are assuming for the FIG. 4 illustrations that that $a_2=0$ for the second n=2 cup (on the right).

So now, given the illustrative supposition that the heights $h=h_1=h_2$ of each cup in FIG. 4 are a priori taken to be the same within desired errors, the user first takes the micrometer system 3 and situates it atop the first cup on the left as shown. The micrometer alignment section 33 is rested atop the cup and the mating features 18 of the cup 1 are mated with the complementary mating features 38 of micrometer alignment section 33 as shown. As a result, the micrometer-proper will be situated such that lower tip 37, when it is descended into contact with the top water surface 36 to produce a meniscus 120, will do so closely proximate the center of the cup 1. Now, the user does exactly that: the micrometer dialing mechanism 34 is dialed carefully and slowly down so as to extend extension head 81 until lower tip 37 makes contact with top water surface 36 as is evidenced to the user by the production of a meniscus 120. The user then stops the dialing, because the micrometer-proper is now at an extension such that it is accurately measuring $d_1$ for the first cup within the precision of the micrometer-proper and within the precision related to the production and detection of the meniscus 120. (As will be later discussed, a wetting agent facilitates better precision as to the production of the meniscus 120.) At that point in time when the meniscus 120 is formed, the micrometer readout meter 32 will also show some reading associated with the extension of the micrometer-proper.

Now, as noted earlier, one may employ absolute or relative measurements. In the present example, let us assume the user decides to employ relative measurements. So, having visually detected the formation of the meniscus 120 in the leftmost cup 1 in FIG. 4, the user has ceased dialing, so that the extension of the micrometer is equal to $d_1$ within desired errors. Now the user actuates the micrometer-proper to reset the numeric reading on the micrometer readout meter 32 to N.NNNNN=0.00000, as is illustrated in FIG. 4. This means that the $d_1$ readout is assigned to zero by definition, and that $d_1$ becomes the "standard" descent against which readings in the second cup 1 (on the right) are to be referred.

Next, the user removes the micrometer system 3 from the first cup 1 and resituates it in the second cup 1 in exactly the same fashion as was done for the first cup. So in FIG. 4, we are not illustrating two different micrometer systems 3 (though it is within the scope of this invention to cross-calibrate and use two or more micrometer systems 3), but rather the use of a single micrometer system 3 for both cups 1. Then, the user performs exactly the same process for the second cup 1 as was performed for the first cup 1.

Specifically, for the second cup (on the right) the user uses the micrometer dialing mechanism 34 to retract the extension head 81 and thus the micrometer tip 37 to an extension above the water surface 36. Then, the user dials 34 the micrometer-proper and thus the extension head 81 downward slowly and carefully until the micrometer tip 37 contacts the water surface 36 as will again be visually indicated to the user by the formation of a meniscus 120. At that very moment when the meniscus 120 is formed, the user stops the dialing, and the number now indicated on the readout meter 32 will directly state how much higher or lower the water level is in the second cup 1 than it was in the first cup 1. Let us assume for sake of discussion only, that the micrometer-proper is configured such that the number on its readout meter 32 becomes larger as the micrometer is extended and smaller as the micrometer is retracted, i.e., that a larger number correlates positively to a longer extension and a smaller number correlates positively to a shorter extension. Of course, it is equally possible that the negative of all of this will be true, and in discussing the specific micrometer system 3 embodiment of FIG. 8 later, we shall in fact use a convention in which the negative is true, i.e., in which a larger number on readout meter 32 correlates with retraction of the micrometer to a shorter distance d.

Then, because the second cup 1 is lower than the first cup 1, the water level 36 of the second cup 1 will be higher than that of the first cup 1, and because the water level is higher, the micrometer tip 37 will contact the surface at a shorter extension and thus, by this assumption about the readout meter 32, the number shown on the readout meter 32 will be less than zero. In the illustration of FIG. 4, simply for example not any limitation, we have shown a reading of N.NNNNN=−0.00047, which shows that the micrometer tip 37 is less-descended by 0.00047 inches when placed in the second n=2 cup 1 than it had been in when placed in the first n=1 cup 1, i.e., that $d_2=d_1-0.00047$. This means, of course, that $l_2=l_1-0.00047$, i.e. that the center of the water level in the second cup is higher than that in the first cup by 0.00047 inches. And, most importantly in terms of the objects of the invention, the readout of N.NNNNN=−0.00047 on a readout meter 32 which correlates positively with the extension of the micrometer proper tells the user that center of the second n=2 cup 1 is centered at 0.00047 inches lower than the center of the first n=1 cup 1, and therefore, that the surface is not level to the tune of 0.00047 inches as between the two cup locations, with the second cup location being lower than the first.

This is how the surface level is measured on a relative scale. On an absolute scale, one simply determines $d_1$ and $d_2$ and then computes their difference. Assuming again that $h=h_1=h_2$ within desired errors, $d_1-d_2=0.00047$, so that $l_2-l_1=0.00047$. The deduced result is the same: the surface is not level by 0.00047, with the second cup location being lower than the first by that amount. If the height of the cups are not quite the same, i.e., if they do differ by some adjustment discrepancy a as earlier discussed, then a will need to be included in these deductions as in equations (2) and (3), or incorporated into the height definition as in equation (4), in a fashion which will be apparent to someone of ordinary skill.

From studying FIG. 4, it will be appreciated why it is important to situate the micrometer system 3 in like fashion from cup to cup via the mating features 18, 38, and why it is preferred (though not strictly required) to center the micrometer-proper along the micrometer alignment section 33. For, if the micrometer-proper was not "dipped" into the water surface 37 at corresponding location from one cup to the next, then especially for a surface that is fairly unlevel, one would obtain readings that are not strictly comparable due to variations of the water level within each cup. For a very-close-to-level surface 35, this is less important, because the variation of 1 within each cup will be miniscule in relation to the presumed separation—on the order of feet—between the cups.

It is also important to note that each of the two fittings 12 in each of the cups is interconnected to a fitting of the other cup via a water tube 4. In this way, the cups are placed in closed series, and there is a complete closed loop for water to flow between the cups. This facilitates the water stabilizing to gravitational level as between the two cups, and is especially pertinent when the system is expanded to include three or more cups, as we shall next examine.

The basic principles reviewed in connection with FIGS. 3 and 4 are readily generalized to more than two such cups, as illustrated in FIG. 5. In general, two cups will establish level over a one-dimensional line and a minimum of three cups is required to establish level over a two dimensional plane. When more than three cups are used, the extra cups can be used to infer flatness.

In FIG. 5 we see a total of five (5) water cups 1 as viewed from above, i.e., N=5, laid out over the measured surface 35 so as to permit level measurements of this surface over the area roughly enclosed within the indicated circle 5 to which we shall ascribe a radius R. This number of cups, five (5), is for illustration only and is in no way limiting as to the number of cups that one might choose to employ for any given level measurement. The cups 1 are fluidically interconnected via a corresponding number of five (5) water tubes 4, which as noted just above are interconnected so as to form a complete closed loop of cups in series. It will be appreciated that once water has been poured into each of the five cups 1 and given a suitable time to level out with all "noise" removed (the details of which will be discussed further later), the water across all five cups 1 will reach a common level acting under the influence of gravity. Once this has occurred, one preferred method of use is for the user to take a first measurement with the micrometer system 3 for the cup 1 in the center, stop the micrometer adjustment just as the meniscus 120 forms, and then, using relative measurement, zero out the reading on the micrometer as was illustrated for the left cup 1 in FIG. 4. Then the user will shuttle the micrometer system 3 over to a second cup 1 and get a measurement as was illustrated for the right cup in FIG. 4. Then, this procedure is extended to the third, fourth and fifth cups, and a micrometer reading is taken and recorded for each of these cups as well. It will be appreciated based on the discussion of FIGS. 3 and 4 how with this data from all five cups, the user will then know exactly how level and flat the surface 35 is as among the five positions at which these measurements were taken.

Now, while the cups 1 in FIG. 5 are configured into a rough circle, the actual placement of the cups when the invention is used in practice will often depend upon the precise application for which the level measurement is needed. For example, let us suppose that one is seeking to level a turbine, or as a different example, a pool table, which in either case we refer to as the "apparatus to-be-leveled." In both examples, it is important for the level to be as close as possible to perfection, because of problems which are otherwise caused by placing these apparatuses onto an unlevel surface. It is to be expected that the turbine in the former case, and the pool table in the latter, will have four or perhaps five identified places at which they will touch the surface 35. These points of contact for the apparatus to-be-leveled are the places for which the level is important, while the level can be ignored—and there can even be placed other items—at locations where there is no point of contact. So, the cups 1 are ideally deployed for measurement, at precisely the places where the apparatus to-be-leveled is expected to make contact with the surface 35. Then, for example, a reading of N.NNNNN=−0.00047 at one of the cups as was illustrated in FIG. 4, would tell the user that shims or some other apparatus or method known in the art will need to be used to raise that point of contact by 0.00047 inches to achieve level. Of course, once shims have been placed or other leveling steps have been taken, the measurement may be taken again, and the shimming process repeated iteratively until a zero reading—or a reading that is close to zero within permitted tolerances for the apparatus to-be-leveled—is obtained.

It is also to be noted that the measurement precision may be different than the leveling tolerance. For example, it may be desired to be able to take level measurements down to 0.00005 inches. But it may be acceptable for one contact point of a turbine to vary from a second contact point by 0.0003 inches, which is six times as large. Then, this invention will make it possible to measure to within 0.00005 inches of measurement precision, whether the turbine footings are leveled to within the 0.0003 inch tolerance for a turbine.

So with all of the foregoing, we have now described in principle how level measurements are taken using this invention. But in order to maximize the precision with which the invention is able to obtain these measurements, there are a number of further aspects to the invention which need to be reviewed. First, the precision is theoretically limited by the adhesive and cohesive physics of the water and the probe tip 37 in relation to the formation of the meniscus 120. That is, if there is a variation of, say, 0.00003 inches over which the meniscus 120 can form when the probe tip 37 approaches the water surface 36, then the inherent uncertainty in any measurement will necessarily be 0.00003 inches no matter what other provisions are made to introduce precision. This is addressed via one or more precision-enhancing measures which include a) optimizing the angling and the surface of the probe tip 37, see the later discussion in FIG. 14 of the angle 141; b) selecting physical materials for the probe 31 and probe tip 37 which inherently are hydrophobic; c) using purified water; and d) adding a wetting agent to decrease the surface tension of the water thereby minimizing water droplet formation on the angled probe tip 37 as well as decreasing the surface tension of the water surface to enhance meniscus 120 formation. All of these measures will serve to physically reduce the height variation for meniscus 120 formation.

Second, because the user must visually see when the meniscus 120 is formed, it is important to aid and enhance this visualization. This is achieved by one or more of a) having the bottom surface inside each cup be mirrored 19 (either at fabrication or by adding a mirror while setting up to measure, see FIGS. 1 and 3 which show the mirror or mirroring situated at the bottom of each water receptacles 14 of each cup 1); b) including one or more illuminating light sources 39 on the micrometer system 3 and preferably on the underside of micrometer alignment section 33 which vividly enhances viewing the meniscus 120.

Third, because the precision is affected by the user being able to immediately stop extending the micrometer probe tip 37 when the meniscus 120 is formed, it is desirable for the micrometer-proper to extend very slowly in response to the user's actuation of micrometer dialing mechanism 34. Additionally, if the bottom surface inside each cup is in fact mirrored 19 as stated above, then it is very desirable to include grade markers e.g., scale lines 91 and numeric markings on a calibration protractor 82 (see FIGS. 8 and 9) attached to the underside of the micrometer-proper which, combination with the mirroring 19, give the user further visual aids for dialing 34 a very careful extension of the probe tip 37. The grade markers 91 also function as a background line reticule reflected back from the mirror 19, and these lines will show distortion when the meniscus 120 is formed due to the refraction of light caused by the curved meniscus 120, see FIG. 13.

Figure 6:
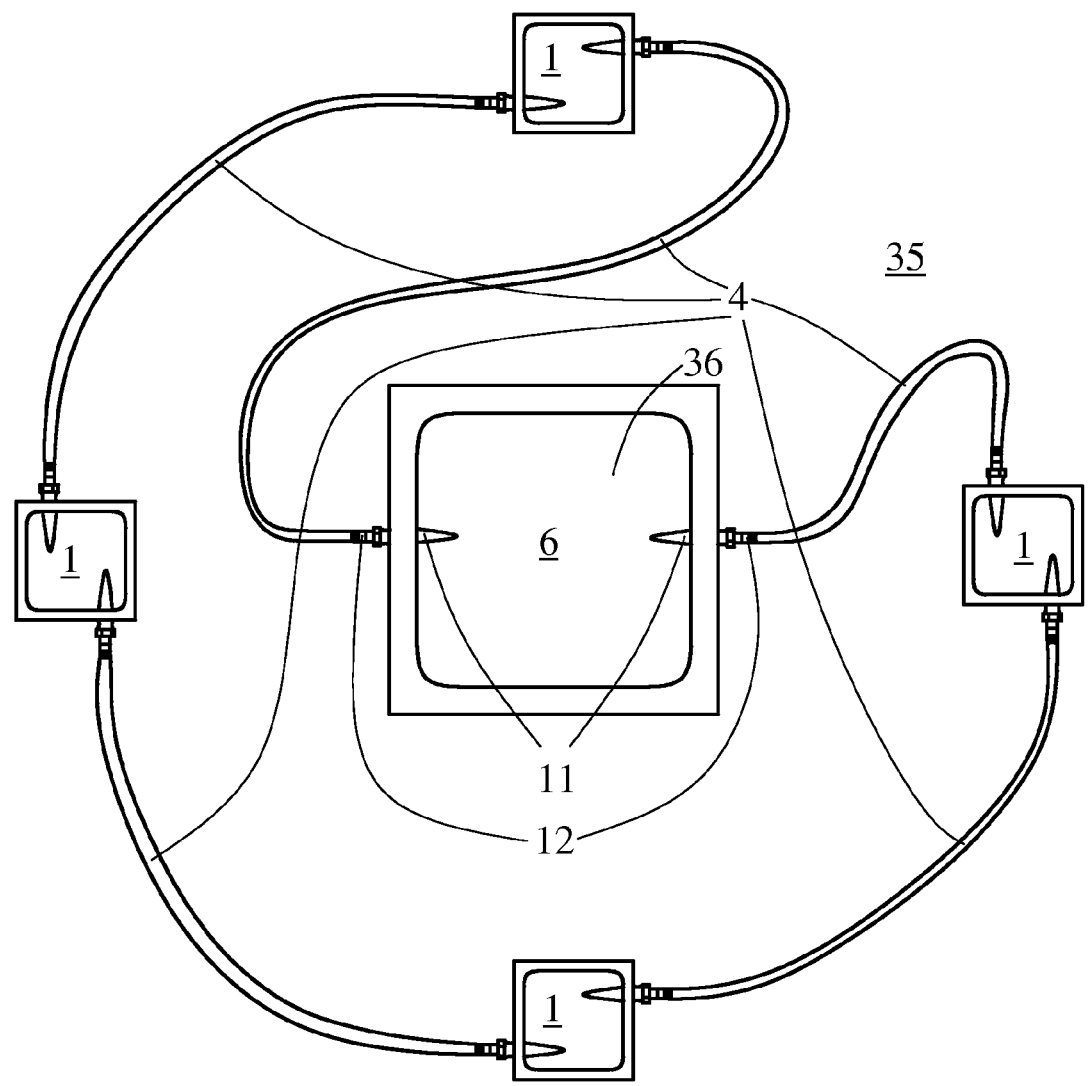
FIG. 6 is a top plan view of a plurality of water cups, in this case four (4) cups, situated to take level and/or flatness measurements over a relatively wider area of a surface for which the level and/or flatness is being measured, with an expansion tank added inline to improve measurement precision.

Fourth, precision can be compromised by such things as bubbles in the lines 4, dust particles in the water and especially on the probe tip 37, and even by temperature gradients either from one area to another of the overall FIG. 5 configuration, or by a temperature difference relative to the ambient environment, because of the thermal expansion or contraction of the water and/or the tubing and/or the water cups. Measurements may also be compromised by water pressure in the tubing 4 caused by the head of water or stretching of the tubing due to excessive drooping. In order to minimize these effects one may employ an optional expansion water tank 6 in series with the tubing, as shown in FIG. 6. The expansion tank 6 has a larger surface area than the water cups and will absorb a majority of the expansion and contraction water volume in cases where the temperature varies considerably or the head of water is large.

Finally, evaporation of the water, separately or with any or all of the above in combination, can affect the measurements. This can be reduced by installing cup covers 150 (see FIG. 15) on the water cups and/or by employing anti-evaporative agents such as but not limited to wax esters, oils, or any other agents for this purpose known to those of ordinary skill in the art. It should be noted at this point that even though the readings from one cup 1 to another may differ due to one or more of the factors mentioned above, that the water level in all cups will be the same at any given instant of time once the water has settled. The reason that the measurements vary is that by using one micrometer and going from cup to cup, a finite amount of time elapses. So if there are changing conditions as mentioned above then the readings will reflect those changes that occur during the time interval. The reduction or elimination of a time period over which these variables can impact measurements is addressed by the alternative preferred embodiment of using multiple cross-calibrated micrometers on all the cups at once (i.e., N micrometers for N cups 1), rather than shuttling a single micrometer from cup to cup Finally, the curvature of the earth itself will affect the level at the 0.0001 inch precision level when the radius of circle in FIG. 5 is more than about 20 feet, because it is gravity itself which defines level which means that "level" on the earth's surface includes a curvature with a 3959 mile radius. This is not an error in the measurement but rather a geometrical physics fact which must be accounted for due to the precision of this invention over the lengths and areas for which level is intended to be measured with this invention. This invention does detect, i.e., its measurements are affected by, the curvature of the earth. As such, the curvature of the earth is a background factor that needs to be accounted and compensated for when taking measurements with this invention, as will next be reviewed.

Figure 16:
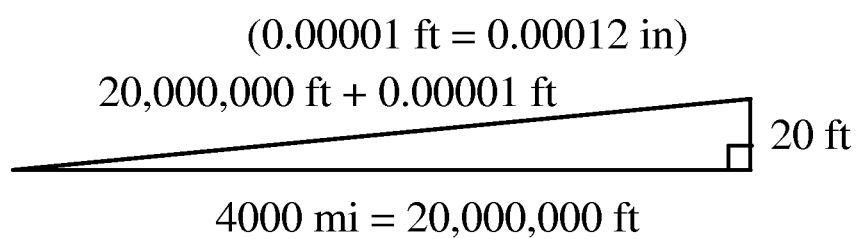
FIG. 16 is a Pythagorean right triangle used to calculate and illustrate the sensitivity of the invention to the curvature of the earth's surface.

A rough calculation of the impact of the earth's curvature on measurements taken with the precision afforded by this invention is illustrated by the simple right-triangle depicted in FIG. 16. As already noted, the earth has a mean radius of about 3959 miles, which we approximate as is often done to 4000 miles. One mile is 5280 feet which we approximate to 5000 feet. Therefore, the earth's radius is approximately 20,000,000 feet which is 4000 miles times 5000 feet per mile. This is illustrated on the horizontal leg of the triangle in FIG. 16. Now let us suppose that we have placed two cups 1 about twenty (20) feet apart on the earth's surface as is illustrated on the vertical leg of FIG. 16. By the Pythagorean Theorem, one may calculate that the hypotenuse of this triangle will exceed 20,000,000 feet by 0.00001 feet. Because 1 foot is equal to 12 inches, this means that by traversing 20 feet along the earth's surface, the level is affected by 12 inches per foot times 0.00001 feet which is 0.00012 inches. So the invention disclosed here, for two water cups 1 situated twenty (20) feet apart, with a measuring precision presumed to be at 0.00005 inches, will in fact detect the earth's surface curvature, because 0.00012 inches is within the detection limits of a system with 0.00005 inches (the earth curvature effect exceeds this precision by a factor of 0.00012/0.00005 which is 2.4). If one gets the measurement precision down to 0.00001 inches, then the earth's-curvature-to-measuring-precision ratio becomes 12. For the ensuing discussion, we shall round all of this to state that at 20 foot separation between cups, the earth's curvature will affect the micrometer measurement by 0.0001 inch, and therefore, that a 0.0001 inch correction will need to be included in order to properly calculate level. Also, it will be appreciated that for more than three cups, this correction may be used to determine flatness, as opposed to level.

Figure 18:
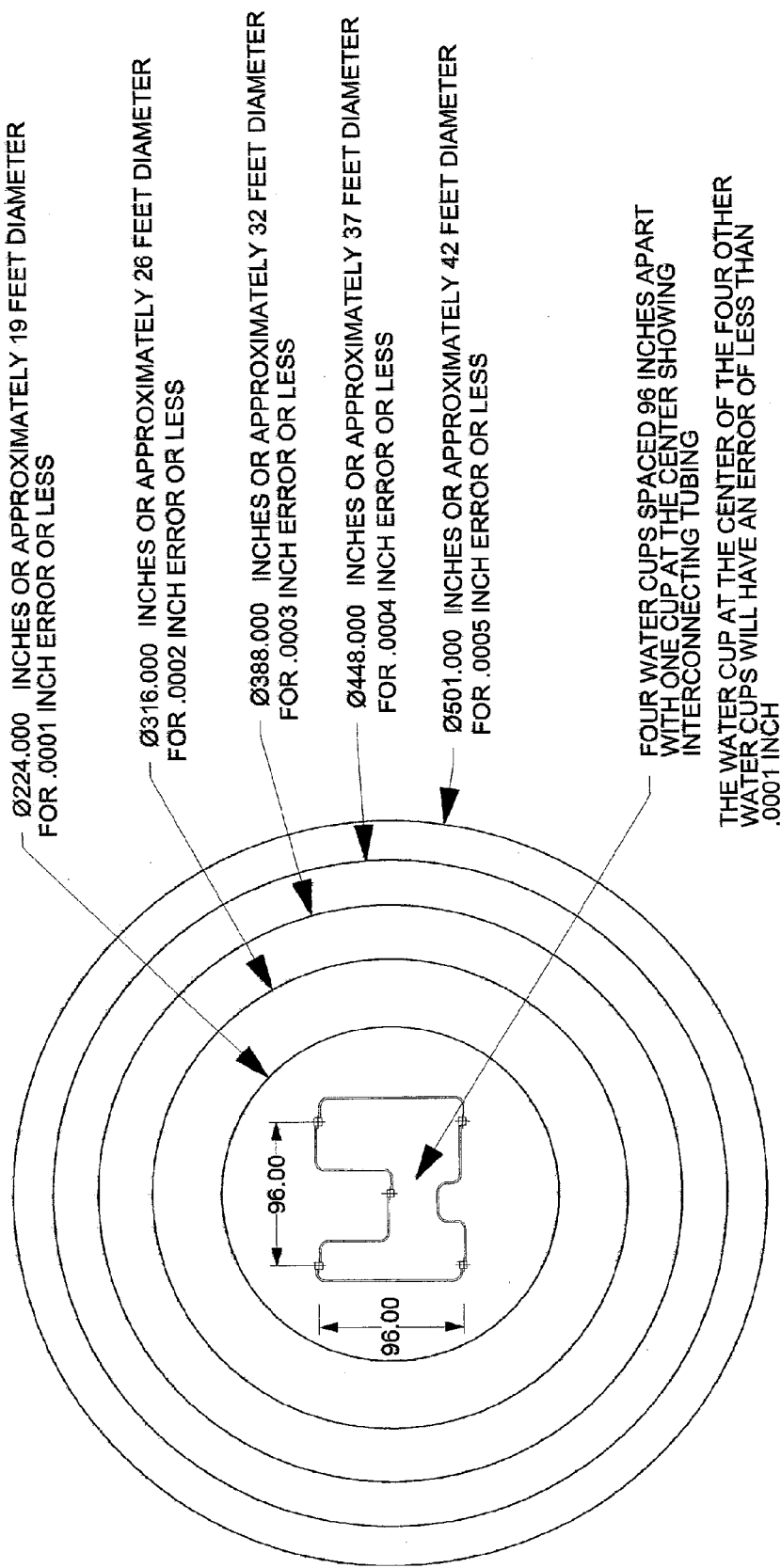
FIG. 18 is a diagram illustrating error correction circles which are used to correct for the deviation from flatness that is naturally introduced into gravitational level measurements by the earth's curvature.

1. FIG. 18 is a diagram illustrating error correction circles which are used to correct for the deviation-from-flatness that is naturally introduced into gravitationally-based level measurements by the earth's curvature. The innermost circle shows the above-calculated 0.0001 inch correction which is required at approximately 19 feet because of this deviation. The next circle shows that there will be a 0.0002 inch deviation/required correction at about 26 feet. And further deviations are shown for 0.0003 inches at about 32 feet, 0.0004 inches at about 37 feet and 0.0005 inches at about 42 feet, all based on the same Pythagorean calculation illustrated in FIG. 16. Note that if the four illustrated outside water cups in FIG. 18, see also FIG. 5, all lie on a common circle, then there is no needed curvature correction. The curvature correction is only needed when flatness is detectable by using a fifth cup at the center of that common circle. And as already noted, in general, two cups measure the level of a line, three cups measure the level of a plane, and only with a fourth properly situated cup, does the measurement of flatness also enter into the equation. So when said the number N of cups 1 is greater than three and one of the water-holding cups is placed substantially at the center of the remaining N−1 cups, the system by virtue of its precision can detect the curvature of the earth. Thus the user is able to deduce by reference to this curvature detection, the degree to which the physical surface is not flat.

In the discussion to follow, we now will describe specific variations and embodiments of the invention which are all oriented toward improving the precision of the level measurements, and will also review the methods by which the invention is used.

In FIG. 6 we illustrate four (4) cups 1 fluidically connected in series with an expansion tank 6. The expansion tank 6 has the same sorts of water outlets 11 and water tube fittings 12 as the cups 1 insofar as its being able to fluidically interconnect with the cups 1 in series and facilitate removal of bubbles by proper angling of these fittings 12 and outlets 11. But, expansion tank 6 has a substantially wider surface are when viewed from above—preferably at least five (5) times the surface area as any individual water cup 1—so that the top surface 36 of the water in the expansion tank 6 will cover a substantially larger surface area than does the top surface 36 of the water in the cups 1 as shown in FIGS. 3 and 4.

The purpose of the expansion tank 6 is to minimize the measurement changes due to temperature variation and water pressure expansion of the vinyl tubing when using a single micrometer to take measurements on multiple cups, as well as such things as tubing expansion and contraction in the system. It will be appreciated that by having at least five (5) times the water surface area when holding water as that of one water cup 1, the expansion tank will reduce the changes and thus the potential for error by a commensurate amount. For example, in a system with five (5) cups 1 and one expansion tank with five (5) times the area of any single cup, any changes are reduced by 50%, so the error tolerance is twice as small. This reflects the easily-appreciated reality that a small volume (e.g., a drop) of water removed, for example, from a swimming pool, will have less of an impact on the overall level than the same volume removed from a cup. Note also that the expansion tank does not have to be level nor is there any need for it to be designed with any precision, because there are no micrometer readings taken for the expansion tank. It should, however be covered to minimize evaporation.

In general, if T (for "tank") represents the water surface area 36 of the expansion tank 6, and if C (for "cup") represents the water surface area 36 of each of the N cups 1 fluidically connected in the series so that T/C is the ratio of the tank area over each cup area, and if $E_1$ (for "error–1") represents the water level changes in the system absent an expansion tank, and if $E_2$ (for "error–2") represents the water level changes in the system once the expansion tank is included, then it will be apparent from a simple geometric analysis based on the surface areas of the water level 36 that:

$$E_2/E_1 = N \times C/(N \times C + T) \quad (5)$$

represents the approximate improvement factor introduced by the expansion tank as to any water level changes. In this formula, N×C is the total area contributed by the N cups alone, and N×C+T is the total area of the cups plus the tank, hence the ratio of the former to the latter. For example, for T/C=12, i.e., for an expansion tank 6 with twelve (12) times the surface area of any individual cup 1, and for N=3 cups, one will have $E_2/E_1 = 3 \times C/(3 \times C + T)$ which via T=12×C becomes $E_2/E_1 = 3 \times C/(15 \times C) = 1/5$. So the change will be one fifth (1/5) as large and the system will be five (5) times more accurate as regards fluid-induced sources of potential error, with the expansion tank 6 than without.

Figure 7:
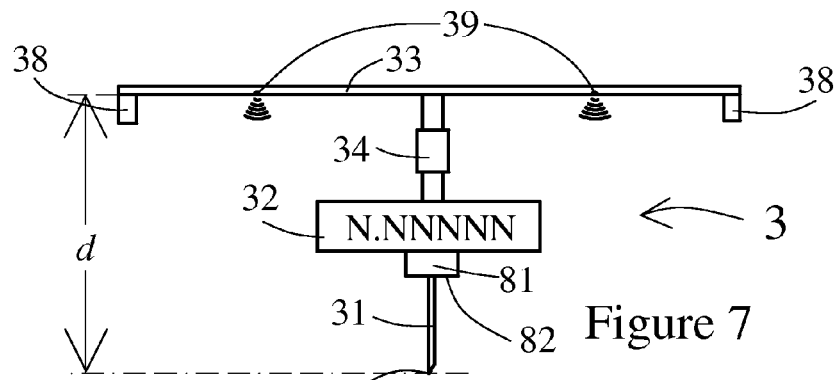
FIG. 7 is a schematic side plan view of the micrometer system 3 first introduced in FIG. 3, separated from its perch atop the cup 1, and showing many of the preferred elements of the micrometer system introduced at some length in connection with FIG. 3.

Now we turn to a detailed examination of preferred embodiments for the micrometer system 3, which is also a very important component of the invention. FIG. 7 schematically illustrates the micrometer system 3 and many of its preferred elements separately from its use to measure level in the manner already discussed in connection with Figured 3 and 4. Many of the preferred elements of the micrometer system were already discussed at some length in connection with FIG. 3. The most important point to note is that this micrometer system 3, as a separate system, must be able to accurately measure the distance d between the bottom of micrometer alignment section 33 and lower tip 37 as indicated, so that when it is used in combination with the cups 1 as discussed in FIG. 3, it will also measure the same distance d by which the top surface 36 of the water is descended below the top surface 15 of any given cup 1. We also in FIG. 7, now introduce a calibration protractor 82 connected to and situated on the bottom of the extension head 81, the function of which will be described in detail in FIGS. 8 through 13.

Figure 8:
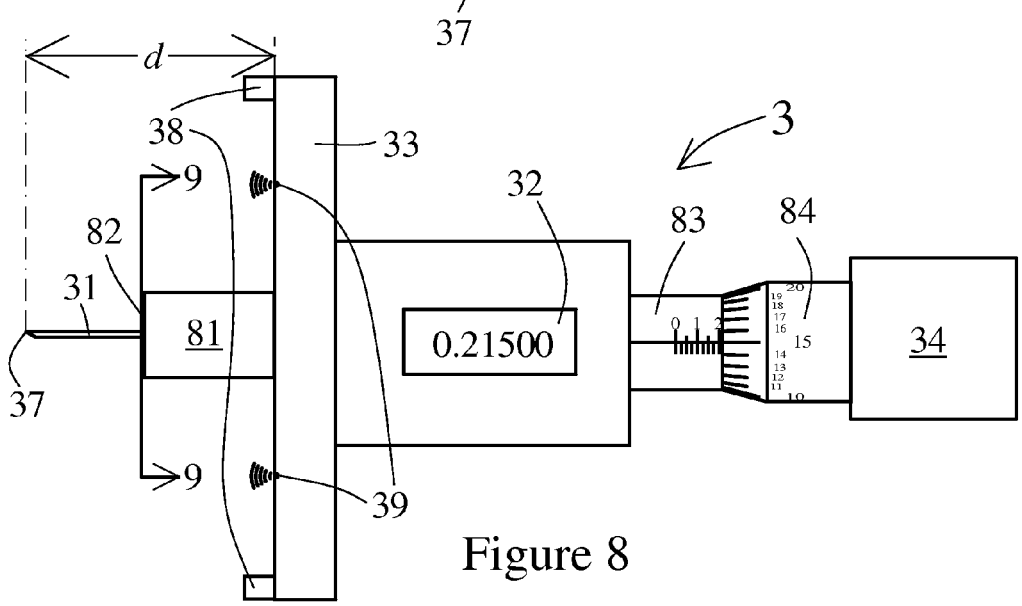
FIG. 8 is a side plan view illustrating a preferred, non-limiting embodiment for the micrometer system as schematically illustrated by FIG. 7.

FIG. 8 shows a non-limiting preferred embodiment for the micrometer system 3 which was schematically illustrated by FIG. 7 and which was shown being used to measure the water level 36 in the cups 1 in FIGS. 3 and 4. In FIG. 8 we now show three interconnected representations of the distance d being measured by this illustrative micrometer system 3 which will now be discussed in detail.

First, we see a Vernier calibration scale which includes a coarse scale arm 83 marked in tenths of an inch, juxtaposed against a finer scale barrel 84 marked in thousandths of an inch. At the specific setting illustrated in FIG. 8, the coarse scale arm 83 shows an extension slightly greater than 0.2 inches, while the finer scale barrel 84 shows that this slight excess over 0.2 inches is 15 thousandths of an inch, i.e., 0.015. Thus taken together, the total extension is 0.215 inches. This is precisely the same reading which is displayed on the readout meter 32, which is the second of the three interconnected representations of the distance d. This readout meter 32, however, also displays at a finest scale, two decimal places past the finer scale, which in this illustration reads 00. Thus, the total readout is 0.21500.

Studying FIG. 8, it will then be appreciated, for example, that if the user were to use the micrometer dialing mechanism 34 to rotate the finer scale barrel 84 with which it is integrally connected very slowly in a clockwise direction from the 15 thousandth to the 14 thousandths setting, the finer scale barrel 84 will move ever so slightly to the left by 0.001 inches relative to the coarse scale arm 83. Because in this system the micrometer dialing mechanism 34 and finer scale barrel 84 are also integrally connected to micrometer extension head 81 which in turn is integrally connected to micrometer probe 31 and lower tip 37, this in turn means that the head 81 will be extended and so the measured distance d will be increased by 0.001 inches, while the readout on 32 will change from 0.21500 to 0.21400. Thus, in this exemplary non-limiting micrometer used for illustration, a larger readout number represents a smaller extension and distance d and a smaller readout number represents a larger extension and distance d. So these micrometer readings are negatively defined in relation to those discussed for FIG. 4.

At the same time, it will be deduced from the study of FIG. 8 that one complete 360 degree turn of the finer scale barrel 84 will correspond to a micrometer movement through 25 thousandths of an inch, or 0.025 inch, or 1/40 inch. Thus, four (4) complete turns of the finer scale barrel 84 will move the micrometer finer scale barrel 84 by 1/10 inch, and thus will laterally traverse one unit of the coarse scale arm 83. The division of each unit on coarse scale arm 83 into four (4) sub-scales thus means that each sub-scale at 1/40 inch corresponds to one complete turn of the finer scale barrel 84.

It will also be deduced from the study of FIG. 8 that as the Vernier alignment is rotated from 15 thousandth to the 14 thousandths setting, the finest scale represented in the last two digits of readout meter 32 will cycle from 00 to 99 to 98 . . . to 01, 00 hundred-thousandths of an inch. That is, the finest scale in the last two digits of readout meter 32 will display 100 gradations simply in the turn from the 15 to the 14 on the finer scale barrel 84, with each gradation representing 0.00001 inch. If the micrometer has a precision of, say, 0.00005 inches, then the finest scale on readout meter 32 will cycle through twenty (20) discrete values from 00 to 95 to 90 . . . to 05 to 00 hundred-thousandths of an inch.

Now, while the Vernier comprising coarse scale arm 83 and finer scale rotating barrel 84 in combination with the readout meter 32 provide two of the three interconnected representations of the distance d being measured by micrometer system 3, the third interconnected representation of d appears on a graduated calibration protractor 82 situated at the bottom of the extension head 81 in the location indicated in FIG. 8. When FIG. 8 is viewed from the cross section 9-9, this calibration protractor 82 appears as illustrated in the left side of FIG. 9. As will now be described, this calibration protractor 82 is an important part of the specialization of the micrometer system 3 to be able to measure level in accordance with this invention.

It will first be seen that the calibration protractor comprises a plurality of grade markers (preferably but not limited to radial lines) 91 in association with several reference numerals. The grade marker 91 corresponding with the numeral "15" on the calibration protractor 82 in FIG. 9 (which is a mirror image of the numeral "15" for reasons to be momentarily reviewed), in view of the cross section 9-9 of FIG. 8, corresponds to and aligns with the same "15" representing the thousands of an inch in the finer scale barrel 84. And it will be seen in fact that all of the (mirror image) numerals on the calibration protractor 82 correspond to and align with the numerals on finer scale barrel 84. Just like the finer scale barrel 84, the calibration protractor 82 contains— in this non-limiting illustration—twenty five (25) gradations 91 corresponding on a one-to-one basis with the twenty-five

(25) gradations on the finer scale barrel 84. Because extension head 81 connects integrally with finer scale barrel 84, this means that when calibration protractor 82 rotates through one of its 25 grades 91, the distance d has moved by one thousandth (0.001) of an inch. And it means that a full rotation of calibration protractor 82 through 360 degrees thereby corresponds to a lateral change of 25 one-thousandths, or ¼₀ inch, in the distance d, and also corresponds to one full rotation of the calibration protractor 82. It will also be seen from FIGS. 8 and 9 that the elongated micrometer probe 31 comprising the probe tip 37 at its lower extremity thereof is connected to the bottom of the micrometer extension head 81 proximate a center of the calibration protractor 82.

Figure 9:
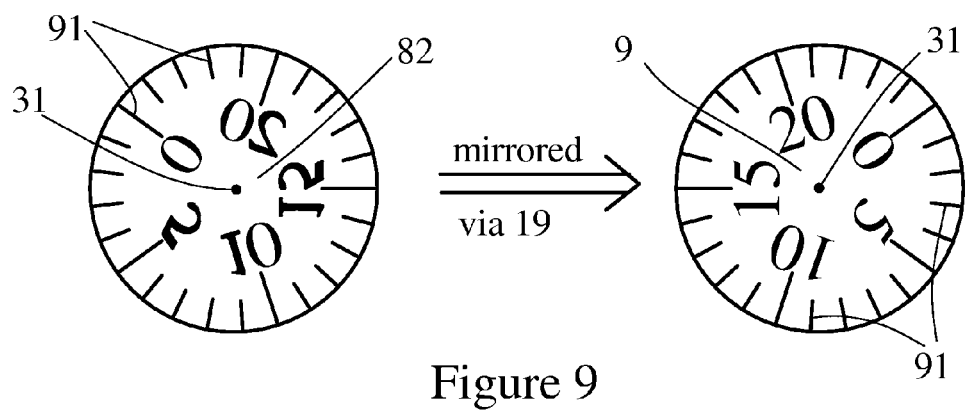
FIG. 9 illustrates a calibration protractor situated on the underside of a micrometer extension head, and its reflection when viewed through a mirror.

It will next be seen, if the calibration protractor 82 illustrated on the left side of FIG. 9 were to be reflected in a mirror (which for the cups 1 is referenced by 19) and aligned vertically in FIG. 9, that what would then be seen is the protractor mirror image 9 illustrated on the right side of FIG. 9. In this mirror image, the numerals are all correctly imaged (rather than reverse-imaged), and the counterclockwise scale on the left side of FIG. 9 is flipped into a clockwise scale. This mirroring in fact does transpire via the mirror or mirroring 19 at the bottom of the cup 1, as will be momentarily elaborated upon. And it will finally again be noticed that the micrometer probe 31 is situated right at the center of calibration protractor 82, and so will also sit at the center of the protractor mirror image 9. The reason for this mirroring, as will next be discussed, is that when the protractor system 3 is used to take measurements of the water level 36 in a cup 1 as shown in FIG. 3, a user looking down into the cup at an acute viewing angle in order to see around the micrometer proper and because of the mirroring at 19, will see a mirror image of the calibration protractor 82 situated at the bottom of extension head 81 with the micrometer probe 31 doubling as an indicator needle against the grade markers 91 of the calibration protractor 82.

Figure 10:
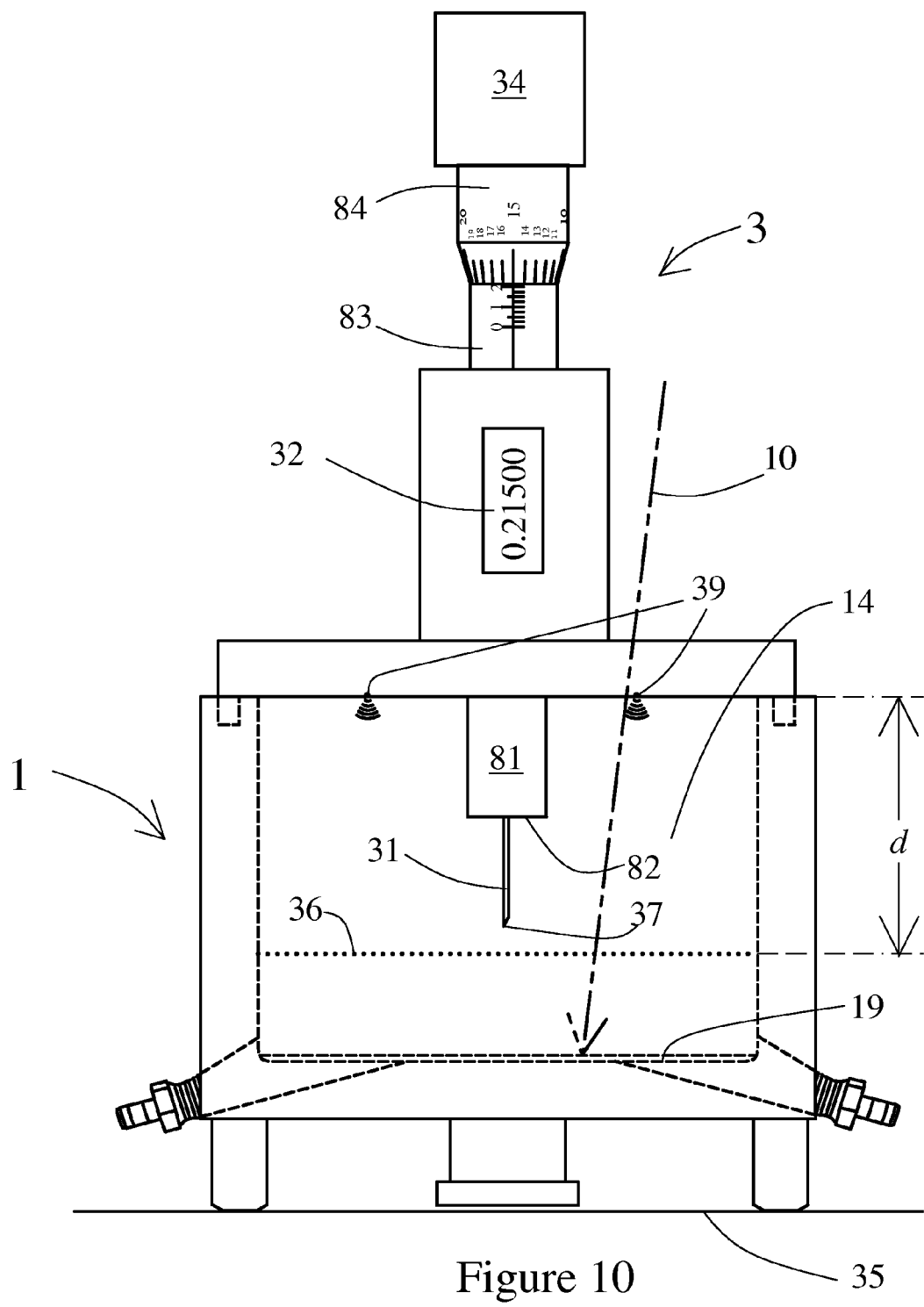
FIG. 10 is a side plan view illustrating the preferred non-limiting embodiment of the micrometer system of FIG. 8, situated atop a water cup in the preferred non-limiting embodiment of FIG. 3, in position to begin taking measurements of the water level in that cup.

Now we turn to FIG. 10 which illustrates the micrometer system 3 in the preferred non-limiting embodiment of FIG. 8, situated atop a water cup 1 in position to begin taking measurements of the water level in that cup. The probe tip 37 is situated a small distance above the water level 36 and the micrometer is situated at an exemplary extension which shows a reading of 0.21500 inches on the readout meter 32 which also matches up with the Vernier readings. Now the user is ready to begin taking a reading of the distance d.

It is at this point in the process when the combined configuration of the illuminating light source 39, the mirroring 19, the calibration protractor 82 and the probe tip 31 becomes a key feature of facilitating a precise measurement of d. Specifically, the user first actuated the micrometer system 3 so as to turn on the light source 39 so that the user can better see into the interior of water receptacle 14 along a line of sight such as that illustrated by the line 10 in FIG. 10. By looking down into water receptacle 14 in this way, with the light source 39 illuminated, the user will clearly see the calibration protractor 82 of FIG. 9, as reflected by the mirror or mirroring 19. In particular, because of the mirroring 19, the image that the user sees will be the mirrored image 9 on the right hand side of FIG. 9, in which the mirrored numerals on the left hand side of FIG. 9 are all visually correct. In addition, with the illustrated line of sight 10 slightly angled as it must be because the micrometer system 3 would block a directly-downward view, the micrometer probe 31 will also be reflected by the mirroring 19, and so will itself be superimposed over the gradations on the mirror-image 9 of calibration protractor 82.

Figure 11:
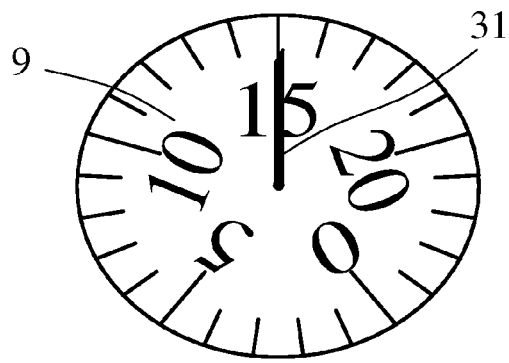
FIG. 11 is a perspective view illustrating how the user will see the reflection of the calibration protractor of FIG. 9 when looking down into the water receptacle of the cup along the line of sight illustrated in FIG. 10.

As a consequence of this combination of elements, what the user will then see when looking into the water receptacle 14 along the slightly angled line of sight 10 away from a line normal to the bottom mirrored 19 surface of the cup 1 is something akin to what is now illustrated in FIG. 11. Specifically, if the user aligns his or her line of sight 10 such that micrometer probe 31 superimposes against the "15" numeral on the mirror image 9 of calibration protractor 82, the user will see that micrometer probe 31 simultaneously serves as an indicator needle enabling the user to visually know precisely the thousandths reading of distance d, namely, in this instance, 0.015 in the overall reading 0.21500. But it is really not necessary for the user to precisely line up his or her sight with the "15" numeral, because the calibration protractor 82 is really intended to enable the user to obtain a visual cue that will enable the user to very carefully and deliberately turn the dial 34 and at the same time be able to gauge the dial's orientation and thus the distance d to which the micrometer system 3 is extended at any given moment.

Specifically, we mentioned earlier in connection with FIG. 8 how the micrometer system 3 contains show three interconnected representations of the distance d being measured. The first was the Vernier calibration scale comprising coarse scale arm 83 and finer scale barrel 84. The second was readout meter 32 which displays the entire reading at the finest scale. And the third was the graduated calibration protractor 82, which comes into play when its mirrored 19 reflection 9 is viewed with micrometer probe 31 simultaneously serving as an indicator needle as shown in FIG. 10.

Why is this necessary? Because as we shall now discuss in detail, the measurement of d is taken precisely when the probe tip 37 touches the water surface 36 to form a meniscus 120, to the greatest degree humanly possible. So in order for the user to know when to stop rotating the dial 34 and thus stop changing d, the user needs to be able to look into water receptacle 14 to watch for the formation of the meniscus 120. While these first two interconnected representations of the distance d at the Vernier 83, 84 and on the readout meter 32 can be viewed by the user at other times, the user cannot view these while looking into water receptacle 14 to watch for the meniscus 120. So the mirrored 19 image 9 of calibration protractor 82 with micrometer probe 31 doubling as an indicator needle provides the means by which the user can precisely monitor the dialing 34 and the measured distance d while simultaneously watching for the formation of the meniscus 120. By having the gradations on calibration protractor 82 correspond in a known way to those on the finer Vernier scale 84, the user can monitor and precisely control the user's dialing 34 of changes in the distance d with a visual feedback loop to facilitate a hand-eye coordination of the fine dialing 34 that is required. It is important that when using the protractor 82 with micrometer probe 31 as described above that the user refrain from moving his or her line of sight while taking readings as this will be perceived as a change in the referenced reading on the protractor 82.

So now let us proceed to take a measurement. Starting from the configuration of FIG. 10, the user makes a visual note of all the readings, then aligns the line of sight 10, then rotates the dial 34 in a clockwise direction (based on the particular orientation of this exemplary, non-limiting micrometer system 3) so as to slowly lower micrometer extension head 81 and thus micrometer probe 31 and lower tip 37 attached thereto. While doing so, and with the light source 39 turned on, the user looks down into water receptacle 14 and watches for the formation of the meniscus 120.

The user, to the greatest degree possible, maintains the line of sight 10, which skill can be developed and honed with practice. Thus, the user will be seeing the mirror image 9 of calibration protractor 82 as illustrated in FIG. 11, but with the protractor viewed to be rotating in a clockwise direction driven directly by and completely tied to the same rotation of the dial 34.

Figure 12:
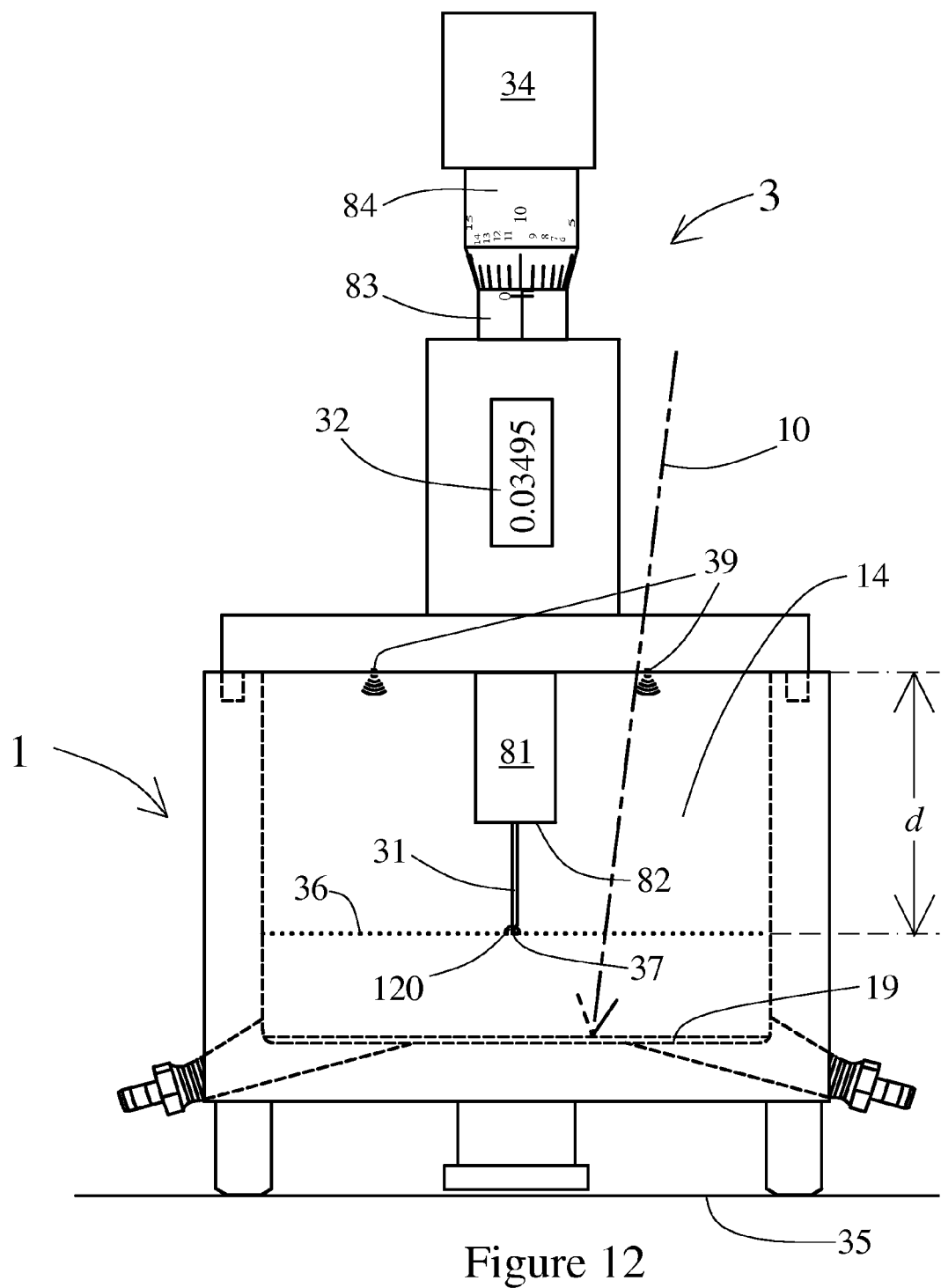
FIG. 12 is the same side plan view which was illustrated in FIG. 10, but with the micrometer system now extended (lowered) into a position to take measurements of the water level in the cup via the formation of a meniscus.

The user keeps up this relatively slow rotation until the instant that the user sees the meniscus 120 form, which is now illustrated in FIG. 12. In the exemplary illustration of FIG. 12, the dial 34 rotation has lowered the lower tip 37 sufficiently to form the meniscus 120, and in the process of this lowering rotation, the readout meter 32 has changed its illustrative digital display from 0.21500 inches to 0.03495 inches, which is to say, the micrometer has extended and descended by the difference of 0.18005 inches as between FIGS. 10 and 12. At the same time, the Vernier reading has changed to this same degree as well. The coarse scale 83 sits between the 0.025 and 0.050 readings. And recalling how four rotations of the finer scale barrel 84 produce a one-tenth of an inch in micrometer movement, the finer scale 84 sits at just under 10 one thousandths of an inch, and to be precise based on the digital reading on the readout meter 32, at 0.00995 inch, or 9.95 thousandths of an inch based on the 0.03495 inches. This represents 25 thousandths a.k.a. one $40^{th}$ of an inch due to one rotation, plus 9.95 thousandths of an inch due to part of a second rotation, totaling 34.95 thousandths or 0.03495 inch. Or, to put this another way, the 34.95 thousandths is equal to 9.95 thousandths modulo 25 thousandths, given that 25 thousandths corresponds with one 360 degree rotation. Of course, all one would see on the Vernier is that that the alignment of the finer scale 84 is a touch below the "10," and the very fine granularity is in the final two decimal digits on readout meter 32 which informs us that this "touch below 10" is "9.95" in hundred-thousandths of an inch.

Figure 13:
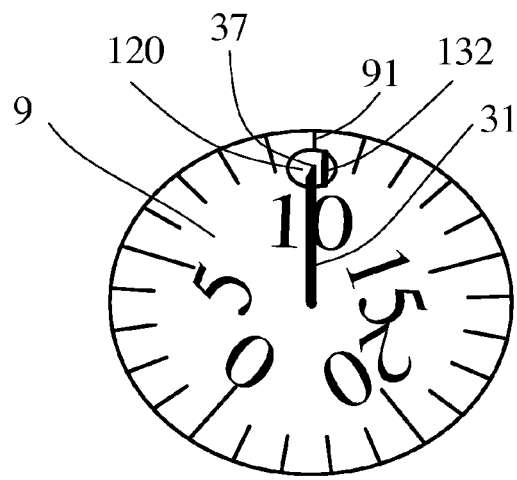
FIG. 13 is the same perspective view illustrated in FIG. 11, but at the moment the meniscus is formed based on the micrometer having been extended into the position of FIG. 12 so as to precipitate formation of the meniscus.

However, the user is not seeing any of these happenings on the Vernier 82, 83 or the readout meter 32, because the user is looking into the cup along the line of sight 10. All that the user sees is illustrated in FIG. 13. Assuming the user has maintained the original line of sight, the user will see that micrometer probe 31, doubling as an indicator needle, now also lines up the same touch "touch below 10" at the moment the meniscus 120 is formed. The formation of the meniscus 120 is now a signal to the user to instantly stop dialing. Because of the illumination provided by light sources 39, and because the meniscus 120 via the mirroring 19 is being seen from below the water surface, the meniscus actually appears in very stark visual relief. In particular, from this mirrored 19 subsurface view of FIG. 13, not only is the formation of meniscus 120 very-distinctively visible, but the meniscus 120 itself acts as a lens to both magnify and—depending on precise visual alignments—shift the printed numbers and grade lines on the mirror image 9 of calibration protractor 82. Specifically, noting the grade line 91 corresponding to the reference numeral "10," the lensing action of meniscus 120 due to physical refraction not only magnifies (widens) grade line 91, but because the meniscus is slightly to the left of this line, it also shifts the line to the right. Thus, the meniscus 120 itself due to optical lensing, magnifies the grade scale on the calibration protractor 82 precisely at the most relevant place for taking a reading. Thus, the net result is a widened and shifted grade line 132 and grade scale resulting wholly from the optical lensing (i.e., magnifying) by the meniscus 120.

So in FIG. 13, not only does the micrometer probe 31 simultaneously double as an indicator needle, but the meniscus itself, which comes into stark relief when it is forms, simultaneously doubles as a lens to magnify the grade lines of the mirror image 9 of calibration protractor 82.

As a theoretical matter, the foregoing is all that is necessary to take the measurement of the water level. That is, once the meniscus is seen as in FIG. 13, the user may stop dialing, look at the finest reading which is on readout meter 32, and take that reading as the reading of distance $d_n$ for that particular $n^{th}$ cup 1. Then, referring to FIGS. 3 and 4 and equations (1) through (4), and also knowing the cup height $h_n$, the user is able to deduce the level $l_n$ of the water in that cup, and then by proceeding as earlier described in FIGS. 3 and 4 for a fluidically-communicating series of cups as in FIG. 5 without and FIG. 6 with an expansion tank 6, the user can proceed to ascertain the level as among all the N cups 1. While the digital readings on readout meter 32 were illustrated in absolute terms in FIGS. 10 and 12 relative to the Vernier calibrations, as discussed earlier, the user can optionally choose after taking a first n=1 cup 1 reading to "zero" the readout meter 32. If the user does choose to do this, then the readings obtained from the subsequent N−1 cups 1 will be relative readings, plus or minus, with respect to the first cup reading, as was schematically shown in the illustration of FIG. 4.

While the above is all that is needed in theory, in practice the user will wish to take at least two readings on each cup 1 just to be certain to confirm the readings. The first time the user sees a meniscus 120 form as in FIG. 13, the user stops the dialing 34 and makes a careful mental note as to precisely where the micrometer probe 31 doubling as an indicator needle has aligned over the grade lines on the mirror image 9 of calibration protractor 82. Then, the user lifts or tilts the micrometer system 3 without removing any water, dials 34 the micrometer counterclockwise about one fourth of a turn (approximately 1/160 inch based on the exemplary non-limiting illustrations here) or less, re-seats the micrometer system 3, and then dials 34 clockwise to again lower the probe tip 37. But now that the user has a mental note of where the micrometer probe 31 doubling as an indicator needle aligned over the grade lines 91 during the first reading, the user will know to especially slow down his or her dialing 34 as that mentally-noted grade line 91 is approached for the second reading. Because each grade line represents one one-thousandth of an inch, once the user approaches to within a couple of one-thousandths of the first reading, the user knows that the meniscus 120 is about to be formed. So the user then dials down as slowly and carefully as the user possibly can (with practice, a user can develop a very "fine touch" for this), so as to now facilitate probe tip 37 descent on the sub-.001 inch level of the very finest gradations shown at the 0.0001 and even finer 0.00001 grades on the readout meter 32. Then, when the meniscus 120 again forms, the user will know that the reading on the readout meter 32 is as accurate as can be. That is then the reading that the user will use for calculating level.

If the micrometer has a sensitivity up to, say, 0.00005 inches, then each 0.00005 inches represents 1/20 of the distance between each of the grade lines shown on the calibration protractor 82 in FIGS. 9, 11 and 13. So to further facilitate the desired "fine touch," optional fine grade lines may be provided on the calibration protractor 82 within the scope of this disclosure and its associated claims. For example, if nineteen such finest grade lines were to be provided between each of the grade lines illustrated in FIGS. 9, 11 and 13, then each of those finest grade lines would correspond to the finest 0.00005 inches sensitivity of the micrometer, although this may not be practical as the lines would be too close together for the eye to perceive. But if one intermediate grade line was to be provided between each of the grade lines illustrated in FIGS. 9, 11 and 13, then each of these grade lines would correspond to 0.0005 inches which is ten times the sensitivity of the micrometer. Then the user would have to mentally exercise hand-eye coordination so as to recognize that movement over each tenth of one of those grade lines is detectable within the micrometer's sensitivity.

While we have developed all of the foregoing discussion under the supposition that a single micrometer system 3 is shuttled from cup to cup to take successive readings, it is possible to calibrate a plurality of like micrometers one to the other, for example, by calibrating each to the same cup with water at the same level. Then these can be deployed across all of the cups 1 for taking readings on each cup 1. This would be a preferred option to achieve the most accurate readings as compared to a single micrometer, but is also more expensive because multiple micrometers need to be purchased. It may also be necessary to synchronize the readings by utilizing multiple users, again with more expense. The benefit of this method, however, is that because all readings will occur at a given instant of time, changes in the water level over time due to error-inducing factors mentioned earlier (thermal expansion, bubbles, pressure, etc.) would not be an issue in achieving accurate readings. Even though a small amount of water would adhere to each of the multiple micrometer probes, this small amount of water would be the same amount removed from each cup and the water level in each cup would change by the same amount thereby not causing any imbalance in the water level between cups. If the expansion tank 6 is used then the expansion tank would mitigate any water removed as previously reviewed in FIG. 6 and the level would be adjusted accordingly in all the water cups. Again, as discussed in FIG. 6, the use of an expansion tank 6 is one very good available embodiment to reduce the impact of any water loss approximately by the ratios shown in equation (5).

The best available mechanical micrometers with present-day technology are capable of reading at a 0.00005 inch precision level. But it is understood that the technology for this may be improved over time, and so the present disclosure is in no way limited to micrometers at their presently-available level or precision. Indeed, if one are to have available a micrometer of unlimited accuracy, then the limiting factors in the taking of measurements with this invention would stem from the tightness of the physical range over which the meniscus 120 is formed, and from the ability of the operator to be able to utilize the accuracy made available by the micrometer system 3 in order to carefully form the meniscus 120 and then take a reading as to the extension distance d at which the meniscus 120 was formed. Although all the preceding discussions regarding the micrometer and distances employed the English measurement system of inches the same analysis would apply to a Metric reading micrometer using meters and decimal divisions of meters.

Aside from the importance of manufacturing the cups to very tight tolerance along this vertical dimension between upper micrometer resting surface 15 and lower contact surfaces 16, all other dimensional features of the cups are irrelevant to physics of the measurement procedure, and are relevant only as a matter of preference for convenience and uniformity.

The precision water level system as described above operates as a hydrostatic system when taking measurements meaning that there is no dynamical flow of water occurring in the interconnecting fluidic couplings. There may be some water migration caused by temperature variations or tubing expansion or contraction or water evaporation as has been previously discussed. However, whenever there is a deliberate adjustment made to disturb the vertical position of one or more of the water cups then the hydraulic system changes from static to dynamic meaning that water will be flowing in the interconnecting fluidic couplings. If the system is then left undisturbed, the flow will gradually diminish to zero and the system will again become static and new measurements can be taken.

The mathematical equations which describe this time-dependent behavior are similar to those for the electrical analogy of a capacitor being charged by a battery. When one first "disturbs" the capacitor by attaching the two terminals of the battery to the two terminals of the capacitor, a current will flow from the battery to the capacitor and the flow will be limited by the resistance of the interconnecting wires and the internal resistance of the battery. Eventually enough electrons will flow and cause the capacitor to charge to the same voltage level as the battery at which point the electron flow will cease. The voltage of the capacitor can graphically be drawn as an exponential function and will have a time constant that will be the resistance of the circuit (R) multiplied by the capacitance (C) of the capacitor or RC and measured in time intervals (seconds). What this means is that after one time constant the capacitor will be charged to 63% of full charge. After 5 time constants the capacitor will be charged to 99.3% of full charge.

This same principle applies to a hydraulic dynamic system and so generalizes to what transpires when moving a water cup 1 vertically as described above. It will take a finite amount of time for the hydraulic system to reach equilibrium after a disturbance to one or more of the water cups 1. When referring to a hydraulic system similar to FIG. 4, testing has shown that when the two cups are connected with 10 feet of 0.25 inch inside-diameter vinyl tubing 4 the time constant is approximately 5 seconds. For 20 feet of connecting tubing 4 the time constant increases to approximately 9 seconds and for 30 feet of tubing the time constant is approximately 14 seconds. If one waits approximately five (5) time constants after which 99.3% of any changes will have occurred, then the wait time is 25, 45, and 70 seconds respectively for the system in FIG. 4 with 10, 20 and 30 feet respectively of 0.25 inside-diameter tubing 4. It can be seen that the tubing lengths are instrumental in determining the amount of time to wait for the system to go from a dynamic state to a static state before reliable micrometer readings may be taken.

Now, as has been noted several times previously and reviewed in relation to FIGS. 16 and 18, due to the curvature of the earth, the water surface that is described by the level in the water cups 1 actually forms portions of a spherical surface with a radius of approximately 4000 miles. Therefore, it is only necessary to correct for this curvature if one is measuring flatness to a tolerance of 0.0001 inch or less and/or when the water cups are outside of a circle with a diameter of about 38 feet, i.e., a 19 foot radius. Again, this is understood via FIG. 18 by the fact that if one looks down on a spherical surface at the crown facing closest to the viewer and draws a circle on the sphere, the center of the circle on the surface of the sphere will project higher than the points on the circumference. When one corrects for flatness, that number has to be combined with the depth micrometer reading to get a corrected flatness reading, as shown in FIG. 18.

Therefore, if a user is attempting to take a reading for flatness, the user positions the flatness measuring water cup at the center of an imaginary circle that will encompass all the other water cups that are used for level measurements. In FIG. 5, the cup 1 at the center can be used to measure for flatness, as it stands at the crown at the center of the FIG. 18 circle.

Although this invention was developed to measure the level of large machinery either in setup or as a maintenance procedure, it can be used for any application in which a precision level surface is required. The operating principle as discussed is based on the fact that water will seek its own level and even though the water is separated into separate compartments which are the water cups 1, so long as the cups 1 are fluidically connected with hollow tubing 4, the water level will be the same in each cup 1. By measuring the distance from the top of each water cup to the level surface of the water and knowing the height of each cup it can be shown that the heights of the surfaces upon which the water cups are resting can be determined from cup to cup, thereby establishing a means of measuring the level surface.

In order to achieve the level measuring accuracy of less than 100 millionths of an inch ($0.0001=10^{-4}$ inch) the following system elements and features and methods are preferred:

1. A micrometer capable of resolving less than 100 millionths of an inch, and preferably 50 millionths or even 10 millionths of an inch.

2. Precision water cups 1 with heights h calibrated to 100 millionths of an inch or less, and specifically, to less than the micrometer precision of point 1. All other dimensional features of the cups are irrelevant to the physics of the measurement procedure, and are relevant only as a matter of preference for convenience and uniformity.

3. Attaching a unique elongated micrometer probe 31 to the micrometer extension head 81. As noted previously, a preferred embodiment for this employs a monofilament line preferably comprising nylon or an equivalent material in terms of its physical characteristics when interacting with water, with a lower tip 37 thereof. Referring to FIG. 14, this elongated micrometer probe 31 has a width 142 not greater than one-eighth (⅛) inch, and preferably, of about 1/32 inch or 1/36 inch. As discussed in connection with FIGS. 11 and 13, elongated micrometer probe 31 also doubles as an indicator needle when juxtaposed against the grade markers 91 of the protractor 82, so it is preferred that elongated micrometer probe 31 be colored so as to provide a good contrast against the protractor 82 and its grade markers 91.

4. It is highly preferred that the probe 31 be hydrophobic so that any water will not readily cling (adhere) to the surface of the probe 31. In ideal embodiment for elongated micrometer probe 31 is to simply employ a small length of ordinary fishing line, which naturally floats on the surface of water due to its intrinsic hydrophobic properties, and which also has a suitable small width 142. Also the probe tip 37 must not have any clinging lint or dust as this will compromise the formation of the meniscus 120.

5. The probe tip 37 should be cut at an acute beveled angle to minimize droplet formation on the tip 37. With an acute angle, any water clinging to the angled cut will not project below the tip 37 of the probe 31 thereby eliminating measurement errors due to clinging water. This preferably-beveled angle is preferably fabricated (e.g., cut) at approximately 30 degrees with the vertex for measuring said angle centered at the tip 37, as referenced by 141 in FIG. 14. While 30 degrees is the preferred magnitude for the probe tip angle 141, this may be run on a continuous basis from as small as ten (10) degrees to as large as forty-five (45) or even sixty (60) degrees. To protect the sharp tip during transport and storage, a protective probe cap should also be provided. It is removed only when taking measurements.

6. An observing mechanism utilizing a submerged mirror or mirroring 19 to perceive the meniscus 120 formation when the probe tip 37 just contacts the water surface 36.

7. An illuminating light source 39 that projects onto the mirroring 19 while the user is observing the probe tip 37 contacting the water surface 36.

8. A reverse reading protractor 82 attached to the underside of the micrometer extension head 81 with the probe 31 doubling as an index/indicator needle that is juxtaposed against the protractor 82. The mirror-reflected protractor image 9 will appear correctly-oriented to the user.

Figure 15:
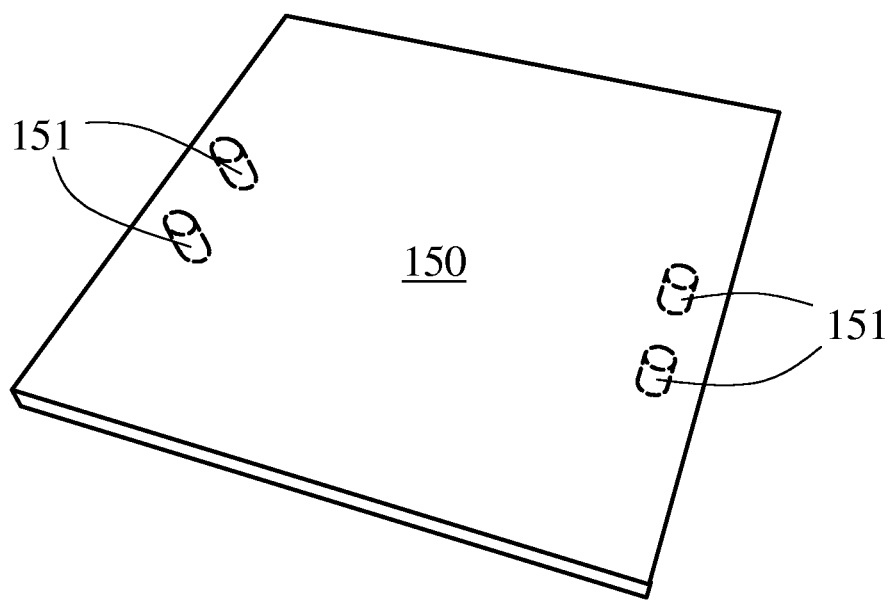
FIG. 15 illustrates a top-front perspective view of a water cup cover used atop the type of cup illustrated in FIG. 1, in order to prevent water evaporation and/or the introduction of dust or other airborne debris which can compromise a measurement if they were to occur.

9. Cup covers 150 for placement over the water cups 1 to minimize contamination and evaporation. As illustrated in FIG. 15, which should be compared with FIG. 1, these covers comprise cover mating features 151 complementary to the cup mating features 18 which are used to mate via 38 with the micrometer alignment section 33 as shown in FIG. 3. These covers 150 are never on the cups 1 at the same time as the micrometer system 3, rather, they are on the cups at times when there is not a micrometer in place to take measurements. That is why the cup mating features 18 have like-complements in both micrometer alignment section 33 mating features 38 and the cover 150 mating features 151.

10. An expansion tank 6, preferably with its own cover (not illustrated) connected in series with the fluidically coupled water cups 1 to minimize the effects of temperature variation and tubing expansion and contraction.

11. Addition of a "wetting agent" to minimize the water surface tension. For example and without limitation, a typical "wetting agent" could be the additive used to prevent water streaking in the photographic development process or the additive used to prevent droplet formation on the windshields of cars and planes, or an equivalent substance.

12. Use of clean or preferably distilled water.

13. Waiting at least 5 time constants after making changes to the height of the water cups before taking new micrometer measurements. The time constants are directly related to the length of interconnecting tubing between water cups, as outlined.

14. If multiple synchronized micrometer measuring is not available, i.e., if a single micrometer is used for all cups rather than having one micrometer per cup with all of the micrometers synchronized in their calibrations, then it is advisable to take into account time variant factors such as temperature, expansion and contraction and evaporation. Note that even with the covers installed on the water cups and expansion tank, nominal evaporation still occurs, but the covers do diminish this significantly.

15. Cleanliness is essential especially for the feet and micrometer resting pads of the water cups as well as the micrometer feet that contact the water cup resting pads. Any dirt or residue will cause errors in the micrometer readings.

16. The interconnecting tubing 4 ("fluidic couplings") should be purged of any air bubbles.

17. The interconnecting tubing 4 should be as vertically close to the level 36 of the water as possible but not any higher than the water level 36. This will help minimize any expansion of the tubing due to the head of water that exists in the tubing. To minimize the head of water, hence the pressure in the tubing, it is important to minimize drooping of the tubing as much as possible. Any excessive drooping also causes stretching of the tubing in an axial direction.

18. When taking micrometer readings it is important that the surface 35 to be leveled is structurally capable of supporting the leveling equipment and the pressure applied to keep the micrometer in intimate contact with the water cups. Due to the sensitivity of the precision water level it will react to excessive forces by measuring any deflection that may arise from these forces such as bodily leaning on the measuring surface or placing extraneous heavy items on the measured surface 35.

The knowledge possessed by someone of ordinary skill in the art at the time of this disclosure, including but not limited to the prior art disclosed with this application, is understood to be part and parcel of this disclosure and is implicitly incorporated by reference herein, even if in the interest of economy express statements about the specific knowledge understood to be possessed by someone of ordinary skill are omitted from this disclosure. While reference may be made in this disclosure to the invention comprising a combination of a plurality of elements, it is also understood that this invention is regarded to comprise combinations which omit or exclude one or more of such elements, even if this omission or exclusion of an element or elements is not expressly stated herein, unless it is expressly stated herein that an element is essential to applicant's combination and cannot be omitted. It is further understood that the related prior art may include elements from which this invention may be distinguished by negative claim limitations, even without any express statement of such negative limitations herein. It is to be understood, between the positive statements of applicant's invention expressly stated herein, and the prior art and knowledge of the prior art by those of ordinary skill which is incorporated herein even if not expressly reproduced here for reasons of economy, that any and all such negative claim limitations supported by the prior art are also considered to be within the scope of this disclosure and its associated claims, even absent any express statement herein about any particular negative claim limitations.

Finally, while only certain preferred features of the invention have been illustrated and described, many modifications, changes and substitutions will occur to those skilled in the art. It is, therefore, to be understood that the appended claims are intended to cover all such modifications and changes as fall within the true spirit of the invention.

I claim:

1. A water-holding cup for use in connection with a hydrostatic system for measuring with precision, a level normal to gravitation of a surface, said cup comprising:
   a cup height h thereof from a bottom to a top of said cup when said cup is resting upon the surface, which cup height h is known a priori within acceptable measurement errors;
   mirroring on a bottom surface of said cup; and
   at least two water outlets for fluidically interconnecting said cup with other like-cups, said outlets oriented at a fitting angle of at least five (5) degrees downward;
   wherein:
   when a micrometer is physically aligned to said top of said cup and a probe tip at a lower extremity of said micrometer is extended to contact the top surface of water within said cup thereby forming a meniscus when said contact occurs, the user is able to see when the meniscus is formed by the reflection of light from the meniscus against said mirroring, and is enabled from the micrometer extension when the meniscus is formed, to ascertain a distance d between said top of said cup and said top surface of said water within said cup; and
   the user is further able to deduce with precision, a level l of the water surface within said cup above said surface by the relation l=h−d.

2. The water-holding cup of claim 1, further comprising a cup cover for preventing evaporation of said water by covering said water-holding cup.

3. A method of using a water-holding cup for measuring with precision, a level normal to gravitation of a surface, said method comprising:
   providing said water-holding cup with a cup height h thereof from a bottom to a top of said cup when said cup is resting upon the surface, which cup height h is known a priori within acceptable measurement errors;
   providing mirroring on a bottom surface of said cup;
   providing at least two water outlets of said cup for fluidically interconnecting said cup with other like-cups, said outlets oriented at a fitting angle of at least five (5) degrees downward;
   physically aligning a micrometer to said top of said cup;
   extending a probe tip at a lower extremity of said micrometer to contact the top surface of water within said cup thereby forming a meniscus when said contact occurs;
   seeing when the meniscus is formed by the reflection of light from the meniscus against said mirroring;
   ascertaining a distance d between said top of said cup and said top surface of said water within said cup from the micrometer extension when the meniscus is formed; and
   deducing with precision, a level l of the water surface within said cup above said surface by the relation l=h−d.

4. The method of claim 3, further comprising covering said water-holding cup, using a cup cover for preventing evaporation of said water.

5. The method of claim 3, further comprising:
   providing a plurality of N of said water-holding cups, where said N is greater than or equal to 2;
   resting said N cups upon the surface for which the level normal to gravitation is to be measured;
   fluidically interconnecting said cups with one another, where each of said cups is designated by a reference numeral n=1, 2, 3 . . . N;
   introducing water into said cups;
   stabilizing a top surface of said water within each cup into being substantially the same as the top surface of said water within all of the other said cups by virtue of the gravitation acting on said water and said water becoming equalized among said cups via said fluidic interconnections;
   measuring water levels within each cup using a micrometer system; and
   deducing with precision from said measuring, how much the surface beneath each of said N cups deviates from being gravitationally level relative to the other N−1 cups.

6. The method of claim 5, further comprising:
   for each said cup, physically aligning a portion of a micrometer system to a top of said cup;
   extending a probe tip at a lower extremity of said micrometer system to contact a top surface of said water within each said cup, thereby forming a meniscus visible when said contact occurs;
   for each said cup, measuring on an absolute or relative scale, a distance $d_n$ between said top of said cup and said top surface of said water within said cup, using said micrometer system;

knowing a priori within acceptable measurement errors for each of said water-holding cups, a cup height $h_n$ thereof from a bottom to a top of said cup which cup height $h_n$;

calculating a level $l_n$ of the water surface within each said cup n above said surface to be equal to $l_n=h_n-d_n$; and by virtue of said micrometer system measuring each of said $d_n$ and thereby implicitly measuring each of said $l_n$, deducing with precision how much the surface beneath each of said N cups deviates from being gravitationally level relative to the other N−1 cups.

7. The method of claim 6, said measuring the water levels within each cup using a micrometer system comprising:

extending and retracting an extension head of said micrometer in response to dialing a dial of said micrometer;

viewing in said mirroring on said bottom surface of said cup, grade markers of a calibration protractor comprising a plurality of grade markers, corresponding with finer scale markers of a Vernier scale, situated on a bottom of said extension head; and guiding the dialing simultaneously with viewing said grade markers, using said grade markers to provide a visual reference.

8. The method of claim 7, further comprising:

visually determining with precision, the setting of said micrometer dial when the meniscus is formed, and using that visual reference to guide the dialing, by:

orienting a line of sight is so as to view said calibration protractor as reflected by said mirroring;

angling the line of sight off of a normal line relative said mirroring; and consequently juxtaposing said micrometer probe against said plurality of grade markers so as to be an indicator needle, while simultaneously configuring said micrometer probe to measure said distance $d_n$ when the meniscus is formed.

9. The method of claim 8, providing additional visual reference to guide the dialing by said meniscus physically acting as a lens due to light refraction and thereby magnifying a grade marker corresponding to the meniscus formation.

10. The method of claim 3, further comprising adding a wetting agent for decreasing a surface tension of said water to minimize water droplet adhesion to said probe tip and enhance meniscus formation.

11. The method of claim 3, said water comprising distilled water.

* * * * *